United States Patent
Matsuura et al.

(10) Patent No.: US 11,773,216 B2
(45) Date of Patent: Oct. 3, 2023

(54) FLUORINE-CONTAINING ETHER COMPOUND, COMPOSITION AND ARTICLE

(71) Applicant: AGC Inc., Tokyo (JP)

(72) Inventors: Keigo Matsuura, Tokyo (JP); Eiichiro Anraku, Tokyo (JP); Ryuta Takashita, Tokyo (JP); Koki Watanabe, Tokyo (JP); Makoto Uno, Tokyo (JP); Koichi Murata, Tokyo (JP); Takafumi Kawakami, Tokyo (JP)

(73) Assignee: AGC Inc., Tokyo (JP)

( * ) Notice: Subject to any disclaimer, the term of this patent is extended or adjusted under 35 U.S.C. 154(b) by 214 days.

(21) Appl. No.: 17/322,288

(22) Filed: May 17, 2021

(65) Prior Publication Data

US 2021/0269591 A1   Sep. 2, 2021

Related U.S. Application Data

(63) Continuation of application No. PCT/JP2019/046025, filed on Nov. 25, 2019.

(30) Foreign Application Priority Data

| Nov. 28, 2018 | (JP) | ................................. | 2018-222871 |
| Nov. 28, 2018 | (JP) | ................................. | 2018-222872 |
| May 10, 2019  | (JP) | ................................. | 2019-089666 |

(51) Int. Cl.
| C08G 65/00 | (2006.01) |
| C07F 7/18 | (2006.01) |
| C08L 71/00 | (2006.01) |
| C09D 171/02 | (2006.01) |
| C09K 3/18 | (2006.01) |

(52) U.S. Cl.
CPC .......... *C08G 65/007* (2013.01); *C07F 7/1804* (2013.01); *C08L 71/00* (2013.01); *C09D 171/02* (2013.01); *C09K 3/18* (2013.01)

(58) Field of Classification Search
CPC ...... C08G 65/007; C09D 171/02; C09K 3/18; C07F 7/1804; C08L 71/00
USPC .......................................................... 524/463
See application file for complete search history.

(56) References Cited

U.S. PATENT DOCUMENTS

| 2003/0097753 A1* | 5/2003 | Sasaki ................... B41J 2/1606 |
| | | 29/890.1 |
| 2018/0148606 A1 | 5/2018 | Hoshino et al. |

FOREIGN PATENT DOCUMENTS

| JP | 64-56688 A | 3/1989 |
| JP | 2003-19803 A | 1/2003 |
| KR | 10-2015-0054149 A | 5/2015 |
| WO | WO 2017/038830 A1 | 3/2017 |

OTHER PUBLICATIONS

International Search Report dated Feb. 25, 2020 in PCT/JP2019/046025, filed on Nov. 25, 2019 2 pages.

* cited by examiner

*Primary Examiner* — Hui H Chin
(74) *Attorney, Agent, or Firm* — Oblon, McClelland, Maier & Neustadt, L.L.P.

(57) ABSTRACT

A fluorinated ether compound and a composition capable of forming a light resistant surface layer and an article are provided. The fluorinated ether compound of the present invention has a poly(oxyfluoroalkylene) chain, a reactive silyl group and a group (A) represented by —NR—C(O)— (wherein R is a hydrogen atom or an alkyl group), wherein the carbonyl carbon in the group (A) is bonded to a carbon atom, and the poly(oxyfluoroalkyiene) chain is located at the nitrogen end of the group (A).

14 Claims, No Drawings

FLUORINE-CONTAINING ETHER COMPOUND, COMPOSITION AND ARTICLE

CROSS-REFERENCE TO RELATED APPLICATIONS

The present application is the national stage of international application PCT/JP2019/046025, filed on Nov. 25, 2019, and claims the benefit of the filing date of Japanese Applications No. 2018-222871, 2018-222872, and 2019-089666, respectively filed on Nov. 28, 2018, Nov. 28, 2018, and May 10, 2019.

TECHNICAL FIELD

The present invention relates to a fluorine-containing ether compound, a composition and an article.

BACKGROUND ART

Fluorinated compounds show high lubricity, water/oil repellency, etc. and are thus suitably used in surface treating agents. Hydrophobic and oleophobic treatment of a substrate with such a surface treating agent provides easy-to-clean properties to the substrate which makes it easy wipe off stains from the substrate surface. Among such fluorinated compounds, fluorinated ether compounds having a poly (oxyfluoroalkylene) chain having ether linkages (—O—) in a fluoroalkylene chain, are flexible compounds and can impart excellent easy-to-clean properties, especially against oily stains.

Among such fluorinated ether compounds, those having a poly(oxyperfluoroalkylene) chain terminating in hydrolysable silyl groups are widely used (Patent Document 1).

PRIOR ART DOCUMENTS

Patent Documents

Patent Document 1: WO2017/038830

DISCLOSURE OF INVENTION

Technical Problem

In recent years, surface layers formed from a fluorinated ether compound are required to have higher performance, such as light resistance.

The present inventors evaluated articles having a surface layer formed on a substrate from fluorinated ether compounds disclosed in Patent Document 1 and found room for improvement in their light resistance.

In view of the above-mentioned problem, the present invention aims to provide a fluorinated ether compound and a composition capable of forming a light-resistant surface layer, and an article having a light-resistant surface layer.

Solution to Problem

As a result of extensive studies on the above-mentioned problem, the present inventors have found that a fluorinated ether compound having a poly(oxyfluoroalkylene) chain, a reactive silyl group and a group (A) represented by —NR—C(O)—, wherein the carbonyl carbon in the group (A) is bonded to a carbon atom, and the poly(oxyfluoroalkylene) chain is located at the nitrogen end of the group (A), can form a light-resistant surface layer, and have accomplished the present invention.

The present inventors have found the following solutions to the above-mentioned problem.

[1] A fluorinated ether compound having a poly(oxyfluoroalkylene) chain, a reactive silyl group and a group (A) represented by —NR—C(O)— (wherein R is a hydrogen atom, an alkyl group or an alkyl group having a reactive silyl group), wherein the carbonyl carbon in the group (A) is bonded to a carbon atom, and the poly(oxyfluoroalkylene) chain is located at the nitrogen end of the group (A).

[2] The fluorinated ether compound according to [1], which further has a group (B) represented by —$R^1$— (wherein $R^1$ is a $C_{1-10}$ alkylene group having no fluorine atoms) which is bonded to the nitrogen atom in the group (A).

[3] The fluorinated ether compound according to [1] or [2], which is represented by the formula (1):

$$Z[-R^f-R^1-NR-C(O)-Y-\{Si(R^2)_nL_{3-n}\}_g]_j \quad (1)$$

wherein $R^f$ is a fluoroalkylene group having at least one fluorine atom on the carbon atom bonded to $R^1$,
$R^1$ is a $C_{1-10}$ alkylene group having no fluorine atoms,
R is a hydrogen atom, an alkyl group or an alkyl group having a reactive silyl group,
Y is a (g+1)-valent organic group having a carbon atom bonded to the carbonyl carbon in the formula (1),
$R^2$ is a monovalent hydrocarbon group,
L is a hydrolysable group or a hydroxy group,
n is an integer of from 0 to 2,
g is an integer of at least 1,
j is 1 or 2, and
Z is a monovalent group represented by $R^{f1}$—$(OX)_m$—O— when j is 1, or a bivalent group represented by —$(OX)_m$—O— when j is 2, wherein $R^{f1}$ is a perfluoroalkyl group, X is a fluoroalkylene group, and m is an integer of at least 2.

[4] The fluorinated ether compound according to [3], wherein the organic group as Y in the formula (1) is a hydrocarbon group which may contain a hetero atom.

[5] The fluorinated ether compound according to [3] or [4], wherein Y has a carbon atom bonded to the silicon atom in $\{Si(R^2)_nL_{3-n}\}_g$ in the formula (1).

[6] The fluorinated ether compound according to any one of [3] to [5], which is a compound represented by the formula (1) wherein Z is a monovalent group represented by $R^{f1}$—$(OX)_m$—O—, wherein X is a $C_{1-6}$ fluoroalkylene group, and $(OX)_m$ is composed of at least two different kinds of (OX).

[7] The fluorinated ether compound according to any one of [3] to [5], wherein Z is a bivalent group represented by —$(OX)_m$—O—, wherein X is a $C_{1-6}$ fluoroalkylene group, and $(OX)_m$ is composed of at least two different kinds of (OX).

[8] A composition which comprises at least two kinds of the fluorinated ether compound as defined in any of [1] to [7], or comprises at least one kind of the fluorinated ether compound as defined in any of [1] to [7] and a fluorinated ether so compound other than the fluorinated ether compound as defined in any of [1] to [7].

[9] The composition according to [8], which comprises the fluorinated ether compound having one group (A) and the fluorinated ether compound having two groups (A).

[10] The composition according to [9], wherein the fluorinated ether compound having one group (A) is a fluorinated ether compound represented by the formula (1) wherein j is 1, and the fluorinated ether compound having two groups (A) is a fluorinated ether compound represented by the formula (1) wherein j is 2:

$$Z[-R^f-R^1-NR-C(O)-Y-\{Si(R^2)_nL_{3-n}\}_g]_j \quad (1)$$

wherein $R^f$ is a fluoroalkylene group having at least one fluorine atom on the carbon atom bonded to $R^1$, $R^1$ is a $C_{1-10}$ alkylene group having no fluorine atoms, R is a hydrogen atom, an alkyl group or an alkyl group having a reactive silyl group, Y is a (g+1)-valent organic group having a carbon atom bonded to the carbonyl carbon in the formula (1), $R^2$ is a monovalent hydrocarbon group, L is a hydrolysable group or a hydroxy group, n is an integer of from 0 to 2, g is an integer of at least 1, j is 1 or 2, and Z is a monovalent group represented by $R^{f1}-(OX)_m-O-$ when j is 1, or a bivalent group represented by $-(OX)_m-O-$ when j is 2, wherein $R^{f1}$ is a perfluoroalkyl group, X is a fluoroalkylene group, and m is an integer of at least 2.

[11] A coating composition comprising the fluorinated ether compound as defined in any one of [1] to [7] or the composition as defined in any one of [8] to [10], and a liquid medium.

[12] An article comprising a substrate and a surface layer formed from the fluorinated ether compound as defined in any one of [1] to [7] or the composition as defined in any one of [8] to [10] on the substrate.

Advantageous Effects of Invention

According to the present invention, it is possible to a fluorinated ether compound and a composition capable of forming a light-resistant surface layer and an article having a light-resistant surface layer.

DESCRIPTION OF EMBODIMENTS

Herein, an atomic group derived from 1 molecule of a monomer by polymerization directly, or by polymerization and subsequent partial chemical modification is referred to as a "unit". The oxyfluoroalkylene groups in a poly(oxyfluoroalkylene) chain are also referred to as "units". A poly (oxyfluoroalkylene) group derived from 1 molecule of a monomer such as a di(oxyfluoroalkylene) group is sometimes referred to as a "unit". A compound represented by the formula (1) will be referred to as a "compound (1)". Compounds represented by other formulae will also be referred to in the same manner.

Herein, "an alkylene group which may have a group (A)" means that the alkylene group may have a group (A) between two carbon atoms in the alkylene group or at an end of the alkylene group, as in alkylene group-group (A)-.

A "bivalent organopolysiloxane residue" means a group represented by the following formula wherein $R^x$ is an alkyl group (preferably a $C_{1-10}$ alkyl group) or a phenyl group, and $g^1$ is an integer of at least 1, preferably an integer of from 1 to 9, particularly preferably an integer of from 1 to 4.

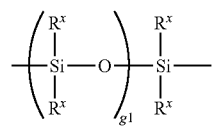

A "silphenylene backbone group" is a group represented by $-Si(R^y)_2PhSi(R^y)_2-$ (wherein Ph is a phenylene group, and $R^y$ is a monovalent organic group). $R^y$ is preferably an alkyl group (more preferably a $C_{1-10}$ alkyl group).

A "dialkylsilylene group" is a group represented by $-Si(R^z)_2-$ (wherein $R^z$ is an alkyl group (more preferably a $C_{1-10}$ alkyl group)).

The "number average molecular weight" of a compound is calculated from the number (average value) of oxyfluoroalkylene groups per a terminal group determined by $^1$H-NMR and $^{19}$F-NMR.

[Fluorinated Ether Compound]

The fluorinated ether compound of the present invention is a compound (hereinafter referred to as a "particular fluorinated ether compound") having a poly(oxyfluoroalkylene) chain, a reactive silyl group and a group (A) represented by $-NR-C(O)-$ (wherein R is a hydrogen atom, an alkyl group or an alkyl group having a reactive silyl group), wherein the carbonyl carbon in the group (A) is bonded to a carbon atom, and the poly(oxyfluoroalkylene) chain is located at the nitrogen end of the group (A).

The present inventors found that a particular fluorinated ether compound having a poly(oxyfluoroalkylene) chain at the nitrogen end of a group (A) can form a more light-resistant surface layer, than a fluorinated ether compound having a poly(oxyfluoroalkylene) chain at the carbon end of a group (A).

It is supposed that because such a particular fluorinated ether compound has a higher visible light transmittance due to the shift of the absorption band for the group (A) to shorter wavelengths, the particular fluorinated ether compound can form a light-resistant surface layer which is unlikely to decompose.

A group (A) is a group represented by the formula (A) and has a carbonyl carbon bonded to another carbon atom, and a poly(oxyfluoroalkylene) chain is located at the nitrogen end of the group (A). Namely, a group (A) is linked to a poly(oxyfluoroalkylene) chain directly or via a linking group so that the nitrogen end of the group (A) is pointed toward the poly(oxyfluoroalkylene) chain.

$$-NR-C(O)- \quad (A)$$

R is a hydrogen atom, an alkyl group or an alkyl group having a reactive silyl group, preferably a hydrogen atom in view of easy production of the particular fluorinated ether compound.

The number of carbon atoms in the alkyl group is preferably from 1 to 10, particularly preferably from 1 to 6.

The alkyl group may be linear or branched.

The alkyl group having a reactive silyl group has preferably from 1 to 3, particularly preferably from 1 to 2 reactive silyl groups. The number of carbon atoms in the alkyl group having a reactive silyl group is preferably from 1 to 20, particularly preferably from 1 to 15.

The particular fluorinated ether compound has at least one group (A), preferably from 1 to 2 groups (A). Two or more groups (A), if present in the molecule, may be the same or different groups, but they are preferably the same groups, in view of availability of the starting materials for the particular fluorinated ether compound and easy production of the particular fluorinated ether compound.

The particular fluorinated ether compound preferably has a group (B) bonded to the nitrogen atom in a group (A).

$$-R^1- \quad (B)$$

$R^1$ is a $C_{1-10}$ alkylene having no fluorine atoms.

The number of carbon atoms in the alkylene group is preferably from 1 to 6, particularly preferably from 1 to 4, in view of formation of a more light-resistant surface layer, availability of the starting materials of the particular fluorinated ether compound, easy production of the particular fluorinated ether compound.

The alkylene group may be linear or branched.

When the particular fluorinated ether compound has a group (B), the particular fluorinated ether compound preferably has as many groups (B) as groups (A), two or more groups (B), if present in the molecule, may be the same or different groups, but they are preferably the same groups in view of availability of the starting materials for the particular fluorinated ether compound and easy production of the particular fluorinated ether compound.

A poly(oxyfluoroalkylene) chain consists of more than one unit represented by the formula (C).

$$(OX) \quad (C)$$

X is a fluoroalkylene group.

The number of carbon atoms in the fluoroalkylene group is particularly preferably from 1 to 6 in view of formation of a more light-resistant surface layer.

The fluoroalkylene group may be linear, branched or cyclic.

The fluoroalkylene group has preferably from one to two times, particularly preferably from 1.7 to 2 times, as many fluorine atoms as carbon atoms, in view of formation of a corrosion resistant surface layer.

The fluoroalkylene group may be a fluoroalkylene group with complete substitution of all the hydrogen atoms by fluorine atoms (a perfluoroalkylene group), is preferably a perfluoroalkylene group in view of formation of an abrasion resistant surface layer.

Specific examples of (OX) include —OCHF—, —OCF$_2$CHF—, —OCHFCF$_2$—, —OCF$_2$CH$_2$—, —OCH$_2$CF$_2$—, —OCF$_2$CF$_2$CHF—, —OCHFCF$_2$CF$_2$—, —OCF$_2$CF$_2$CH$_2$—, —OCH$_2$CF$_2$CF$_2$—, —OCF$_2$CF$_2$CF$_2$CH$_2$—, —OCH$_2$CF$_2$CF$_2$CF$_2$—, —OCF$_2$CF$_2$CF$_2$CF$_2$CH$_2$—, —OCH$_2$CF$_2$CF$_2$CF$_2$CF$_2$—, —OCF$_2$CF$_2$CF$_2$CF$_2$CF$_2$CH$_2$—, —OCH$_2$CF$_2$CF$_2$CF$_2$CF$_2$CF$_2$—, —OCF$_2$—, —OCF$_2$CF$_2$—, —OCF$_2$CF$_2$CF$_2$—, —OCF(CF$_3$)CF$_2$—, —OCF$_2$CF$_2$CF$_2$CF$_2$—, —OCF(CF$_3$)CF$_2$CF$_2$—, —OCF$_2$CF$_2$CF$_2$CF$_2$CF$_2$—, —OCF$_2$CF$_2$CF$_2$CF$_2$CF$_2$CF$_2$— and —O-cyclo C$_4$F$_6$—.

-Cyclo C$_4$F$_6$— means a perfluorocyclobutanediyl group such as a perfluorocyclobutane-1,2-diyl group.

The number of (OX), m, is an integer of at least 2, preferably an integer of from 2 to 200, more preferably an integer of from 5 to 150, particularly preferably an integer of from 5 to 100, most preferably an integer of from 10 to 50.

(OX)$_m$ may consist of two or more kinds of (OX), which may be bonded in any order without particular restrictions, and, for example, may be bonded randomly, alternately or in blocks.

"Consist of two or more kinds of (OX)" means that in the particular fluorinated ether compound, at least two kinds of (OX) different in the number of carbon atoms, at least two kinds of (OX) different in the number of hydrogen atoms, at least two kinds of (OX) different in in the position of hydrogen atoms, or at least two kinds of (OX) which have the same number of carbon atoms but are different in the presence or absence of a side chain or in the kind of side chain (the number of side chains and the number of carbon atoms in the side chains) are present.

The poly(oxyfluoroalkylene) chain is preferably a poly(oxyfluoroalkylene) chain in which oxyperfluoroalkylene groups predominate as (OX) in view of formation of an anti-fingerprint surface layer. In a poly(oxyfluoroalkylene) chain represented by (OX)$_m$, the percentage of the number of oxyperfluoroalkylene groups to the total number of (OX), m, is preferably from 50 to 100%, more preferably from 80 to 100, particularly preferably from 90 to 100%.

The poly(oxyfluoroalkylene) chain is preferably a poly(oxyperfluoroalkylene) chain or a poly(oxyperfluoroalkylene) chain flanked by a hydrogen-containing oxyfluoroalkylene unit at either end or both ends.

Regarding the arrangement of at least two kinds of (OX), for example, $\{(OCF_2)_{m21}(OCF_2CF_2)_{m22}\}$ represents a random arrangement of m21 (OCF$_2$)'s and m22 (OCF$_2$CF$_2$)'s, and (OCF$_2$CF$_2$—OCF$_2$CF$_2$CF$_2$CF$_2$)$_{m25}$ represents an alternative arrangement of m25 (OCF$_2$)'s and m25 (OCF$_2$CF$_2$)'s.

As (OX)$_m$, (OCH$_{ma}$F$_{(2-ma)}$)$_{m11}$(OC$_2$H$_{mb}$F$_{(4-mb)}$)$_{m12}$, (OC$_3$H$_{mc}$F$_{(6-mc)}$)$_{m13}$, (OC$_4$H$_{md}$F$_{(8-md)}$)$_{m14}$, (OC$_5$H$_{me}$F$_{(10-me)}$)$_{m15}$, (OC$_6$H$_{mf}$F$_{(12-mf)}$)$_{m16}$, (O-cycloC$_4$H$_{mg}$F$_{(6-mg)}$)$_{m17}$ is preferred, wherein -cycloC$_4$H$_{mg}$F$_{(6-mg)}$ is a fluorocyclobutanediyl group, preferably a fluorocyclobutane-1,2-diyl group.

ma is 0 or 1, mb is an integer of from 0 to 3, mc is an integer of from 0 to 5, md is an integer of from 0 to 7, me is an integer of from 0 to 9, mf is an integer of from 0 to 11, and mg is an integer of from 0 to 5.

Each of m11, m12, m13, m14, m15, m16 and m17 is independently an integer of at least 0, preferably at most 100.

m11+m12+m13+m14+m15+m16+m17 is an integer of at least 2, preferably an integer of from 2 to 200, more preferably an integer of from 5 to 150, further preferably an integer of from 5 to 100, particularly preferably an integer of from 10 to 50.

m12 is preferably an integer of at least 2, particularly preferably an integer of from 2 to 200.

C$_3$H$_{mc}$F$_{(6-mc)}$, C$_4$H$_{md}$F$_{(8-md)}$, C$_5$H$_{me}$F$_{(10-me)}$ and C$_6$H$_{mf}$F$_{(12-mf)}$ may be linear or branched, but are preferably linear in view of formation of a more abrasion-resistant surface layer.

The above formula just denotes the kinds and numbers of units and does not denote the arrangement of units. Namely, m11 to m16 just denote numbers of the respective units. For example, (OCH$_{ma}$F$_{(2-ma)}$)$_{m11}$ does not mean a block composed of m11 (OCH$_{ma}$F$_{(2-ma)}$) units. Similarly, the formula does not mean that the (OCH$_{ma}$F$_{(2-ma)}$) to (O-cyclo C$_4$H$_{mg}$F$_{(6-mg)}$) units are arranged in the same order as they appear.

In the formula, when two or more of m11 to m17 are not 0 (when (OX)$_m$ is composed of at least two different kinds of units), the arrangement of these different kinds of units may be a random, alternate or block arrangement or a combination of thereof.

Further, when any of the above-mentioned units are present in plural numbers, the units may be of different species. For example, when m11 is at least 2, the plurality of (OCH$_{ma}$F$_{(2-ma)}$) may consist of the same or different species of units.

As (OX)$_m$, the following structures are preferred.
$\{(OCF_2)_{m21}(OCF_2CF_2)_{m22}\}$,
(OCF$_2$CF$_2$)$_{m23}$,
(OCF$_2$CF$_2$CF$_2$)$_{m24}$,
(OCF$_2$CF$_2$—OCF$_2$CF$_2$CF$_2$CF$_2$)$_{m25}$,
(OCF$_2$CF$_2$CF$_2$CF$_2$)$_{m26}$(OCF$_2$)$_{m27}$,
(OCF$_2$CF$_2$CF$_2$CF$_2$)$_{m26}$(OCF$_2$CF$_2$)$_{m27}$,
(OCF$_2$CF$_2$CF$_2$CF$_2$CF$_2$)$_{m26}$(OCF$_2$)$_{m27}$,
(OCF$_2$CF$_2$CF$_2$CF$_2$CF$_2$)$_{m26}$(OCF$_2$CF$_2$)$_{m27}$,
(OCF$_2$CF$_2$CF$_2$CF$_2$CF$_2$—OCF$_2$)$_{m28}$, $(OCF_2CF_2CF_2CF_2CF_2—OCF_2CF_2)_{m28}$,
$(OCF_2CF_2CF_2CF_2CF_2CF_2—OCF_2)_{m28}$,
$(OCF_2CF_2CF_2CF_2CF_2CF_2—OCF_2CF_2)_{m28}$,
$(OCF_2—OCF_2CF_2CF_2CF_2CF_2)_{m28}$,
$(OCF_2—OCF_2CF_2CF_2CF_2CF_2CF_2)_{m28}$,
$(OCF_2CF_2—OCF_2CF_2CF_2CF_2CF_2)_{m28}$, and
$(OCF_2CF_2—OCF_2CF_2CF_2CF_2CF_2CF_2)_{m28}$.

Wherein, m21 is an integer of at least 1, m22 is an integer of at least 1, m21+m22 is an integer of from 2 to 500, each of m23 and m24 is independently an integer of from 2 to 500, m25 is an integer of from 1 to 250, each of m26 and m27 is independently an integer of at least 1, m26+m27 is an integer of from 2 to 500, and m28 is an integer of from 1 to 250.

As $(OX)_m$, the following are preferred in view of easy production of the particular fluorinated ether compound.

$\{(OCF_2)_{m21}(OCF_2CF_2)_{m22}\}$,
$(OCF_2CF_2CF_2)_{m24}$,
$(OCF_2CF_2)_2\{(OCF_2)_{m21}(OCF_2CF_2)_{m22-2}\}$,
$(OCF_2CF_2—OCF_2CF_2CF_2CF_2)_{m25-1}OCF_2CF_2$,
$(OCF_2CF_2CF_2CF_2CF_2—OCF_2)_{m28}$,
$(OCF_2CF_2CF_2CF_2CF_2CF_2—OCF_2)_{m28}$,
$(OCF_2CF_2—OCF_2CF_2CF_2CF_2CF_2)_{m28-1}OCF_2CF_2$, and
$(OCF_2CF_2—OCF_2CF_2CF_2CF_2CF_2CF_2)_{m28-1}OCF_2CF_2$.

Wherein m22, m25 and m28 are chosen so that m22-2, m25-1 and m28-1 are integers of at least 1.

Especially, in the case of $\{(OCF_2)_{m21}(OCF_2CF_2)_{m22}\}$, m22/m21 is preferably from 0.1 to 10, more preferably from 0.2 to 5.0, further preferably from 0.2 to 2.0, particularly from 0.2 to 1.5, most preferably from 0.2 to 0.85, in view of formation of an anti-fingerprint surface layer with higher abrasion resistance.

A reactive silyl group means a hydrolysable silyl group or a silanol group (Si—OH). As a hydrolysable silyl group, a group represented by the formula (D) later wherein L is a hydrolysable group, is specifically mentioned.

A hydrolysable silyl group turns into a silanol group represented by Si—OH upon hydrolysis. Silanol groups thus formed undergo dehydration condensation to form a Si—O—Si linkage. A silanol group thus formed can also undergo dehydration condensation with a silanol group on the surface of a substrate to form a Si—O—Si linkage.

The reactive silyl group is preferably a group (D).

$$—Si(R^2)_nL_{3-n} \quad (D)$$

The number of groups (D) in the particular fluorinated ether compound is at least 1, preferably at least 2, more preferably from 2 to 10, particularly preferably from 2 to 6, in view of formation of an abrasion resistant surface layer.

When plural groups (D) are present in the molecule, they may be of the same kind or of different kinds, but they are preferably of the same kind.

$R^2$ is a monovalent hydrocarbon group, preferably a monovalent saturated hydrocarbon group. The number of carbon atoms in $R^2$ is preferably from 1 to 6, more preferably from 1 to 3, particularly preferably from 1 to 2.

L is a hydrolyzable group or a hydroxy group.

A hydrolyzable group as L turns into a hydroxy group upon hydrolysis. Namely, a hydrolysable silyl group represented by Si-L turns into a silanol group represented by Si—OH upon hydrolysis. Silanol groups thus formed undergo dehydration condensation to form a Si—O—Si linkage. A silanol group thus formed can also undergo dehydration condensation with a silanol group derived from an oxide in a substrate to form a Si—O—Si linkage.

The hydrolyzable group as L may, for example, be an alkoxy group, an aryloxy group, a halogen atom, an acyl group or an isocyanato group (—NCO). The alkoxy group is preferably a $C_{1-4}$ alkoxy group. The aryloxy group is preferably a $C_{3-10}$ aryloxy group which may contain a heteroaryl group as the aryl moiety. The halogen atom is preferably a chlorine atom. The acyl group is preferably a $C_{1-6}$ acyl group. The acyloxy group is preferably a $C_{1-6}$ acyloxy group.

L is preferably a $C_{1-4}$ alkoxy group or a halogen atom in view of easy production of the fluorinated ether compound. L is preferably a $C_{1-4}$ alkoxy group for less outgassing during coating and better storage stability of the fluorinated ether compound and particularly preferably an ethoxy group for long-lasting storage stability of the fluorinated so ether compound, or a methoxy group for a shorter reaction time after coating.

n is an integer of from 0 to 2.

n is preferably 0 or 1, particularly preferably 0. The presence of a plurality of L enables formation of a firm bond between the surface layer and a substrate.

When n is at most 1, the plurality of L in one molecule may be the same or different, but is preferably the same in view of availability of starting materials and easy production of the fluorinated ether compound. When n is 2, the plurality of $R^2$ in one molecule may be the same or different, but is preferably the same in view of availability of starting materials and easy production of the fluorinated ether compound.

The fluorinated ether compound preferably has such a structure that it has a poly(oxylalkylene) chain at the nitrogen end of a group (A) and a reactive silyl group at the carbon end of a group (A) in view of formation of a surface layer more resistant to light and abrasion, and it particularly preferably has a group (B) between the group (A) and the poly(oxylalkylene) chain.

The particular fluorinated ether compound is preferably a compound (1) in view of formation of a more light-resistant surface layer.

$$Z[—R^f—R^1—NR—C(O)—Y—\{Si(R^2)_nL_{3-n}\}_g)]_j \quad (1)$$

$R^f$ is a fluoroalkylene group having at least one fluorine atom on the carbon atom bonded to $R^1$. The number of carbon atoms in the fluoroalkylene group is preferably from 1 to 6, particularly preferably from 1 to 3.

The fluoroalkylene group may be linear or branched, but it is preferably linear to enhance the effect of the present invention.

The fluoroalkylene group has at least one fluorine atom, preferably from 1 to 10 fluorine atoms, particularly preferably from 1 to 6 fluorine atoms in view of formation of a more light-resistant surface layer.

The fluoroalkylene group may be a fluoroalkylene group with complete substitution of all the hydrogen atoms by fluorine atoms (a perfluoroalkylene group).

Specific examples of $R^f$ include —$CF_2CHF$—, —$CHFCF_2$—, —$CH_2CF_2$—, —$CF_2CF_2CHF$—, —$CHFCF_2CF_2$—, —$CH_2CF_2CF_2$—, —$CH_2CF_2CF_2CF_2$—, —$CH_2CF_2CF_2CF_2CF_2$—, —$CH_2CF_2CF_2CF_2CF_2CF_2$—, —$CF_2$—, —$CF_2CF_2$—, —$CF_2CF_2CF_2$—, —$CF(CF_3)CF_2$—, —$CF_2CF_2CF_2CF_2$—, —$CF(CF_3)CF_2CF_2$—, —$CF_2CF_2CF_2CF_2CF_2$— and —$CF_2CF_2CF_2CF_2CF_2CF_2$—.

When j is 2, the plurality of $R^f$ may be the same or different.

$R^1$, R, $R^2$, L and n are the same as defined previously. When j is 2, the plurality of $R^1$, R, $R^2$, L and n may be the same or different, respectively.

Y is a (g+1)-valent organic group having a carbon atom bonded to the carbonyl carbon in the formula (1).

The organic group may, for example, be a carbon atom, a hydrocarbon group which may have a hetero atom or an organopolysiloxane residue, and is preferably a hydrocarbon group which may have a hetero atom.

When Y is a hydrocarbon group which may have a hetero atom, the hetero atom is preferably present between carbon atoms. Namely, Y is preferably a hydrocarbon group having a carbon atom directly bonded to the silicon atom in $\{Si(R^2)_nL_{3-n}\}_g$ in the formula (1), irrespective of whether or not it has a hetero atom. Y particularly preferably has a trimethylene group flanked by the silicon atom in $\{Si(R^2)_nL_{3-n}\}_g$ in the formula (1).

The hydrocarbon group may be a saturated hydrocarbon group or an unsaturated hydrocarbon group, and may be linear, branched or cyclic. Aromatic hydrocarbon groups are categorized as cyclic unsaturated hydrocarbon groups.

The number of carbon atoms in the hydrocarbon group is preferably from 1 to 20, particularly preferably from 1 to 10.

The hetero atom may, for example, be an etheric oxygen atom, a nitrogen atom, a silicon atom or a sulfur atom, and is preferably an etheric oxygen atom, a nitrogen atom or a silicon atom.

When j is 2, the plurality of Y may be the same or different.

g is an integer of at least 1, and is preferably an integer of from 2 to 4, more preferably 2 or 3, particularly preferably 3, in view of formation of a more abrasion-resistant surface layer.

When g is at least 2, the plurality of $\{Si(R^2)_nL_{3-n}\}$ may be the same or different.

j is 1 or 2.

When j is 1, Z is a monovalent group represented by $R^{f1}-(OX)_m-O-$.

When j is 2, Z is a bivalent group represented by $-(OX)_m-O-$.

X and m are the same as defined previously.

$R^{f1}$ is a perfluoroalkyl group.

The number of the perfluoroalkyl group is preferably from 1 to 20, more preferably from 1 to 10, particularly preferably from 1 to 6, in view of formation of an abrasion resistant surface layer.

The perfluoroalkyl group may be linear, branched or cyclic.

The perfluoroalkyl group may, for example, be $CF_3-$, $CF_3CF_2-$, $CF_3CF_2CF_2-$, $CF_3CF_2CF_2CF_2-$, $CF_3CF_2CF_2CF_2CF_2-$, $CF_3CF_2CF_2CF_2CF_2CF_2-$ or $CF_3CF(CF_3)-$, and is preferably $CF_3-$, $CF_3CF_2-$ or $CF_3CF_2CF_2-$ in view of formation of a more water/oil repellent surface layer.

The group $-Y-\{Si(R^2)_nL_{3-n}\}_g$ in the formula (1) is preferably a group (1-1A).

$$Q^a\text{-}X^{11}(\text{-}Q^b\text{-}Si(R^2)_nL_{3-n})_h(-R^{11})_j \quad (1\text{-}1A)$$

$R^2$, L and n are the same as defined previously.

$Q^a$ is a single bond or a bivalent organic group.

The bivalent organic group may, for example, be a bivalent hydrocarbon group, a bivalent heterocyclic group or a bivalent hydrocarbon or heterocyclic group containing $-O-$, $-S-$, $-SO_2-$, $-C(O)-$ or $-Si(R^a)_2-$ and having a carbon atom bonded to the carbonyl carbon in the formula (1). $R^a$ is an alkyl group (preferably a $C_{1-10}$ alkyl group) or a phenyl group. $R^a$ is a hydrogen atom or an alkyl group (preferably a $C_{1-10}$ alkyl group). The bivalent hydrocarbon group may, for example, be a bivalent saturated hydrocarbon group, a bivalent aromatic hydrocarbon group, an alkenylene group or an alkynylene group. The bivalent saturated hydrocarbon group may be linear, branched or cyclic and may, for example, be an alkylene group. The number of carbon atoms in the bivalent saturated hydrocarbon group is preferably from 1 to 20. The bivalent aromatic hydrocarbon group preferably has from 5 to 20 carbon atoms and may, for example, be a phenylene group. The alkenylene group is preferably a $C_{2-20}$ alkenylene group, and the alkynylene group is preferably a $C_{2-20}$ alkynylene group.

The combination of two or more of them may, for example, be $-OC(O)-$, an alkylene group having an etheric oxygen atom, an alkylene group having $-OC(O)-$ or alkylene-$Si(R^a)_2$-phenylene-$Si(R^a)_2$.

$X^{11}$ is a single bond, an alkylene group, a carbon atom, a nitrogen atom, a silicon atom or a bivalent to octavalent organopolysiloxane residue, provided that when $Q^a$ is a single bond, $X^{11}$ is an alkylene group or a carbon atom.

The alkylene group may have $-O-$, a silphenylene backbone group, a bivalent organopolysiloxane residue or a dialkylsilylene group. The alkylene group may have more than one group selected from $-O-$, silphenylene backbone groups, bivalent organopolysiloxane residues and dialkylsilylene groups.

The number of carbon atoms in the alkylene group as $X^{11}$ is preferably from 1 to 20, particularly preferably from 1 to 10.

The bivalent to octavalent organopolysiloxane residue may be a bivalent organopolysiloxane residue or a (w2+1)-valent organopolysiloxane residue, which will be described later.

$Q^b$ is a single bond or a bivalent organic group.

The definition of the bivalent organic group is defined as that of Q.

$R^{11}$ is a hydroxy group, an alkyl group or a fluoroalkyl group.

The number of carbon atoms in the alkyl group is preferably from 1 to 5, more preferably from 1 to 3, particularly preferably 1.

The number of carbon atoms in the fluoroalkyl group is preferably from 1 to 5, more preferably from 1 to 3, particularly preferably 1. The fluoroalkyl group may be a fluoroalkyl group with complete substitution of all the hydrogen atoms by fluorine atoms (a perfluoroalkyl group).

When $X^{11}$ is a single bond or an alkylene group, h is 1, and i is 0.

When $X^{11}$ is a nitrogen atom, h is an integer of from 1 to 2, i is an integer of from 0 to 1, and h+i is 2, When $X^{11}$ is a carbon atom or a silicon atom, h is an integer of from 1 to 3, i is an integer of from 0 to 2, and h+i is 3.

When $X^{11}$ is a bivalent to octavalent organopolysiloxane residue, h is an integer of from 1 to 7, i is an integer of from 0 to 6, and h+i is 7.

When two or more $(-Q^b\text{-}Si(R^2)_nL_{3-n})$'s are present, the $(-Q^b\text{-}Si(R^2)_nL_{3-n})$'s may be the same or different. When two or more $R^{11}$'s are present, the $(-R^{11})$'s may be the same or different.

As the group (1-1A), the groups (1-1A-1) to (1-1A-6) are preferred.

$$-Q^{b1}\text{-}SiR^2_nL_{3-n} \quad (1\text{-}1A\text{-}1)$$

$$-Q^{a2}\text{-}N[\text{-}Q^{2b}\text{-}Si(R^2)_nL_{3-n}]_2 \quad (1\text{-}1A\text{-}2)$$

$$-Q^{a3}\text{-}G(R^g)[\text{-}Q^{b3}\text{-}Si(R^2)_nL_{3-n}]_2 \quad (1\text{-}1A\text{-}3)$$

$$-Q^{a4}\text{-}(O)_{t4}-C[-(O)_{u4}\text{-}Q^{b4}\text{-}Si(R^2)_nL_{3-n}]_{3-w1}(R^{11})_{w1} \quad (1\text{-}1A\text{-}4)$$

$$-Q^{a5}\text{-}Si[\text{-}Q^{b5}\text{-}Si(R^2)_nL_{3-n}]_3 \quad (1\text{-}1A\text{-}5)$$

$$-Q^{a6}\text{-}Z^a[\text{-}Q^{b6}\text{-}Si(R^2)_nL_{3-n}]_{w2} \quad (1\text{-}1A\text{-}6)$$

In the formulae (1-1A-1) to (1-1A-6), $R^2$, L and n are the same as defined previously.

$Q^{b1}$ is an alkylene group which may have —O—, a silphenylene backbone group, a bivalent organopolysiloxane residue or a dialkylsilylene group. The alkylene group may have more than one group selected from —O—, silphenylene backbone groups, bivalent organopolysiloxane residues and dialkylsilylene groups.

In the alkylene group, —O—, a silphenylene backbone group, a bivalent organopolysiloxane residue or a dialkylsilylene group, if present, is located between carbon atoms.

The number of carbon atoms in an alkylene group as $Q^{b1}$ is preferably from 1 to 10, particularly preferably from 2 to 6.

$Q^{b1}$ is preferably —CH$_2$OCH$_2$CH$_2$CH$_2$—, —CH$_2$OCH$_2$CH$_2$OCH$_2$CH$_2$CH$_2$—, —CH$_2$CH$_2$—, —CH$_2$CH$_2$CH$_2$—, —CH$_2$OCH$_2$CH$_2$CH$_2$Si(CH$_3$)$_2$OSi(CH$_3$)$_2$CH$_2$CH$_2$— or —CH$_2$CH$_2$OCH$_2$CH$_2$CH$_2$— (which is bonded to Si at its right end) in view of easy production of the compound.

$Q^{a2}$ is an alkylene group, —C(O)— or a C$_2$ or higher alkylene group having an etheric oxygen atom, —C(O)—, —C(O)O—, —OC(O)— or —NH— between carbon atoms.

The number of carbon atoms in an alkylene group as $Q^{a2}$ is preferably from 1 to 10, particularly preferably from 1 to 6.

The number of carbon atoms in a C$_2$ or higher alkylene group having an etheric oxygen atom, —C(O)—, —C(O)O—, —OC(O)— or —NH— between carbon atoms as $Q^{a2}$ is preferably from 2 to 10, particularly preferably from 2 to 6.

$Q^{a2}$ is preferably —CH$_2$—, —CH$_2$CH$_2$—, —CH$_2$CH$_2$CH$_2$—, —CH$_2$OCH$_2$CH$_2$—, —CH$_2$NHCH$_2$CH$_2$—, —CH$_2$CH$_2$OC(O)CH$_2$CH$_2$— or —C(O)— (which is bonded to N at its right end).

$Q^{b2}$ is an alkylene group or a C$_2$ or higher alkylene group having a bivalent organopolysiloxane residue, an etheric oxygen atom or —NH— between carbon atoms.

The number of carbon atoms in an alkylene group as $Q^{b2}$ is preferably from 1 to 10, particularly preferably from 2 to 6.

The number of carbon atoms in an alkylene group having a bivalent organopolysiloxane residue, an etheric oxygen atom or —NH— between carbon atoms $Q^{b2}$ is preferably from 2 to 10, particularly preferably from 2 to 6.

$Q^{b2}$ is preferably —CH$_2$CH$_2$CH$_2$— or —CH$_2$CH$_2$OCH$_2$CH$_2$CH$_2$— (which is bonded to Si at its right end).

The two [-$Q^{b2}$Si($R^2$)$_n$L$_{3-n}$]'s may be the same or different.

$Q^{a3}$ is a single bond or an alkylene group which may have an etheric oxygen atom, and is preferably a single bond in view of easy production of the compound. When it is an alkylene group having an etheric oxygen atom, the etheric oxygen atom is not directly bonded to the carbonyl carbon in the formula (1).

The number of carbon atoms in the alkylene group which may have an etheric oxygen atom is preferably from 1 to 10, particularly preferably from 2 to 6.

G is a carbon atom or a silicon atom, provided when $Q^3$ is a single bond, G is a carbon atom.

$R^g$ is a hydroxy group or an alkyl group. The number of carbon atoms in an alkyl group as $R^g$ is preferably from 1 to 4.

G($R^g$) is preferably C(OH) or Si($R^{ga}$) (wherein $R^{ga}$ is an alkyl group, preferably C$_{1-10}$ alkyl group, particularly preferably a methyl group).

$Q^{b3}$ is an alkylene group or a C$_2$ or higher alkylene group having an etheric oxygen atom or a bivalent organopolysiloxane residue between carbon atoms.

The number of carbon atoms in an alkylene group as $Q^{b3}$ is preferably from 1 to 10, particularly preferably from 2 to 6.

The number of carbon atoms in an alkylene group having an etheric oxygen atom or a bivalent organopolysiloxane residue between carbon atoms as $Q^b$ is preferably from 2 to 10, particularly preferably from 2 to 6.

$Q^{b3}$ is preferably —CH$_2$CH$_2$—, —CH$_2$CH$_2$CH$_2$— or —CH$_2$CH$_2$CH$_2$CH$_2$CH$_2$CH$_2$CH$_2$CH$_2$— in view of easy production of the compound.

The two [-$Q^{b3}$-Si($R^2$)$_n$L$_{3-n}$]'s may be the same or different.

$Q^{a4}$ is a single bond or an alkylene group which may have an etheric oxygen atom, provided when t4 is 1, $Q^{a4}$ is an alkylene group which may have an etheric oxygen atom. When it is an alkylene group having an etheric oxygen atom, the etheric oxygen atom is not directly bonded to the carbonyl carbon in the formula (1).

The number of carbon atoms in the alkylene group which may have an etheric oxygen atom is preferably from 1 to 10, particularly preferably from 2 to 6.

t4 is 0 or 1 (provided that when $Q^{a4}$ is a single bond, t4 is 0).

-$Q^{a4}$-(O)$_{t4}$— is preferably a single bond, —CH$_2$— or —CH$_2$CH$_2$— in view of easy production of the compound.

$Q^{b4}$ is an alkylene group which may have —O—, a silphenylene backbone group, a bivalent organopolysiloxane residue or a dialkylsilylene group.

In the alkylene group, —O— or a silphenylene backbone group, if present, is preferably located between carbon atoms. In the alkylene group, a bivalent organopolysiloxane residue or a dialkylsilylene group, if present, is preferably located between carbon atoms or next to (O)$_{u4}$.

The number of carbon atoms in an alkylene group as $Q^{b4}$ is preferably from 1 to 10, particularly preferably from 2 to 6.

u4 is 0 or 1.

—(O)$_{u4}$-$Q^{b4}$- is preferably —CH$_2$CH$_2$—, —CH$_2$CH$_2$CH$_2$—, —CH$_2$OCH$_2$CH$_2$CH$_2$—, —CH$_2$OCH$_2$CH$_2$CH$_2$CH$_2$CH$_2$—, —OCH$_2$CH$_2$CH$_2$—, —OCH$_2$CH$_2$—, —OSi(CH$_3$)$_2$CH$_2$CH$_2$CH$_2$—, —OSi(CH$_3$)$_2$OSi(CH$_3$)$_2$CH$_2$CH$_2$CH$_2$— or —CH$_2$CH$_2$CH$_2$Si(CH$_3$)$_2$PhSi(CH$_3$)$_2$CH$_2$CH$_2$— (which is bonded to SI at its right end) for easy production of the compound.

w1 is an integer of from 0 to 2, preferably 0 or 1, particularly preferably 0.

When two or more [—(O)$_{u4}$-$Q^{b4}$-Si($R^2$)$_n$L$_{3-n}$]'s are present, the [—(O)$_{u4}$-$Q^{b4}$-Si($R^2$)$_n$L$_{3-n}$]'s may be the same or different.

When two or more $R^{11}$'s are present, the (—$R^{11}$)'s may be the same or different. $R^{11}$ is the same as defined previously.

$Q^{a5}$ is an alkyl group which may have an etheric oxygen atom. When it is an alkylene group having an etheric oxygen atom, the etheric oxygen atom is not directly bonded to the carbonyl carbon in the formula (1).

The number of carbon atoms in the alkylene group which may have an etheric oxygen atom is preferably from 1 to 10, particularly preferably from 2 to 6.

$Q^{a5}$ is preferably —CH$_2$OCH$_2$CH$_2$CH$_2$—, —CH$_2$OCH$_2$CH$_2$OCH$_2$CH$_2$CH$_2$— or —CH$_2$CH$_2$—, —CH$_2$CH$_2$CH$_2$— (which is bonded to Si at its right end) for easy production of the compound.

$Q^{b5}$ is an alkylene group or a $C_2$ or higher alkylene group having an etheric oxygen atom or a bivalent organopolysiloxane residue between carbon atoms.

The number of carbon atoms in an alkylene group as $Q^{b5}$ is preferably from 1 to 10, particularly preferably from 2 to 6.

The number of carbon atoms in a $C_2$ or higher alkylene group having an etheric oxygen atom or a bivalent organopolysiloxane residue between carbon atoms $Q^{b5}$ is preferably from 2 to 10, particularly preferably from 2 to 6.

$Q^{b5}$ is preferably —CH$_2$CH$_2$CH$_2$— or —CH$_2$CH$_2$OCH$_2$CH$_2$— (which is bonded to Si at its right end) for easy production of the compound, The three $[-Q^{b5}-Si(R^2)_nL_{3-n}]$'s may be the same or different.

$Q^{a6}$ is an alkylene group which may have an etheric oxygen atom. When it is an alkylene group having an etheric oxygen atom, the etheric oxygen atom is not directly bonded to the carbonyl carbon in the formula (1).

The number of carbon atoms in the alkylene group which may have an etheric oxygen atom is preferably from 1 to 10, particularly preferably from 2 to 8.

$Q^{a6}$ is preferably —CH$_2$OCH$_2$CH$_2$CH$_2$—, —CH$_2$OCH$_2$CH$_2$OCH$_2$CH$_2$—, —CH$_2$CH$_2$— or —CH$_2$CH$_2$CH$_2$— (which is bonded to Si at its right end) in view of easy production of the compound.

$Z^a$ is a (w2+1)-valent organopolysiloxane residue.

w2 is an integer of from 2 to 7.

As the (w2+1)-valent organopolysiloxane residue, the following groups may be mentioned. In the following formulae, $R^a$ is the same as previously defined.

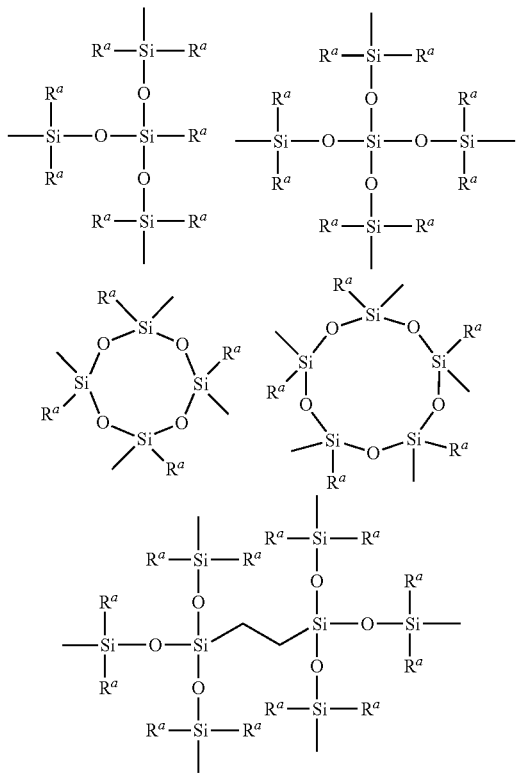

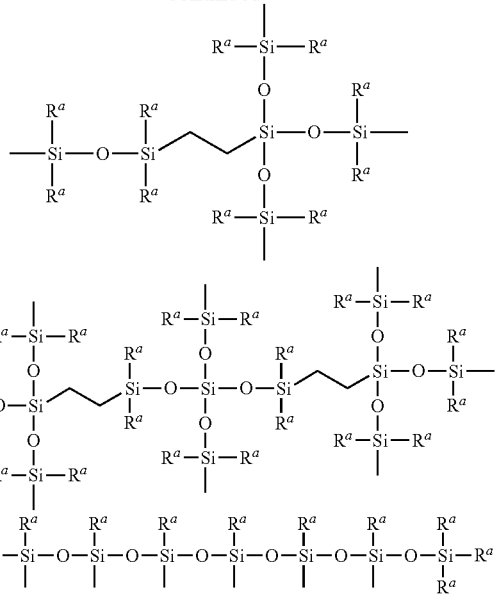

$Q^{b6}$ is an alkylene group or a $C_2$ or higher alkylene group having an etheric oxygen group or a bivalent organopolysiloxane residue between carbon atoms.

The number of carbon atoms in an alkylene group as $Q^{b6}$ is preferably from 1 to 10, particularly preferably from 2 to 6.

The number of carbon atoms in an alkylene group having an etheric oxygen group or a bivalent organopolysiloxane residue between carbon atoms as $Q^{b6}$ is preferably from 2 to 10, particularly preferably from 2 to 6.

$Q^{b6}$ is preferably —CH$_2$CH$_2$— or —CH$_2$CH$_2$CH$_2$— in view of easy production of the compound.

w2 $[-Q^{b6}-Si(R^2)_nL_{3-n}]$'s may be the same or different.

Specific examples of the structure represented by $R^f-R^1-NR-C(O)-Y-\{Si(R^2)_nL_{3-n}\}_g$ in the formula (1) are given below. In the following formulae, $R^f$ is the same as previously defined.

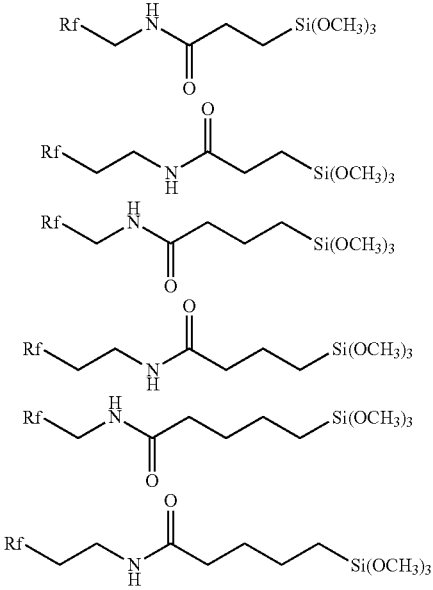

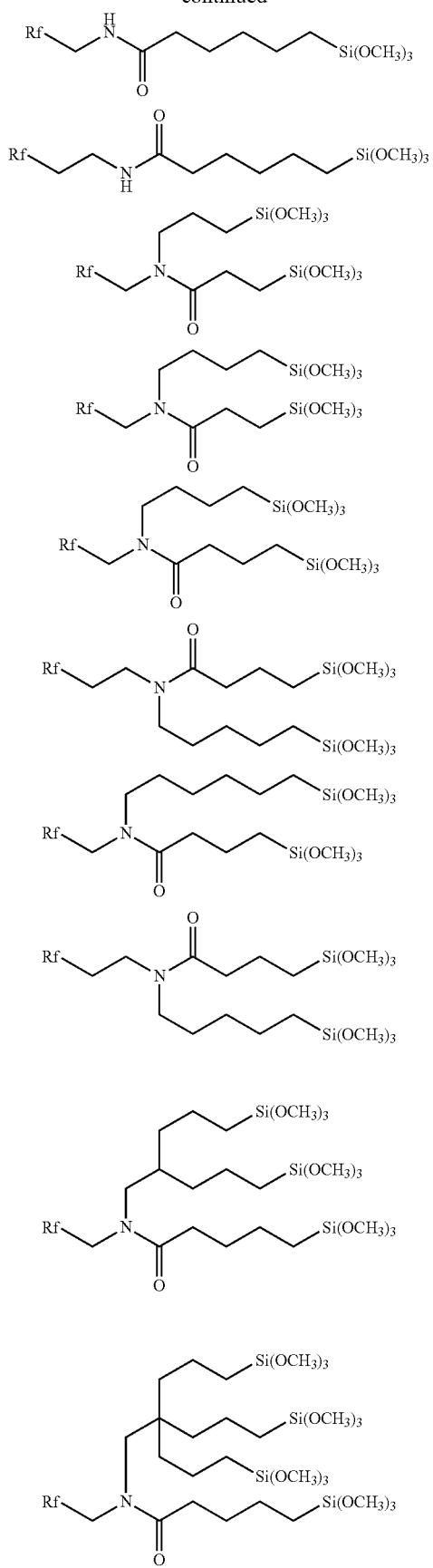
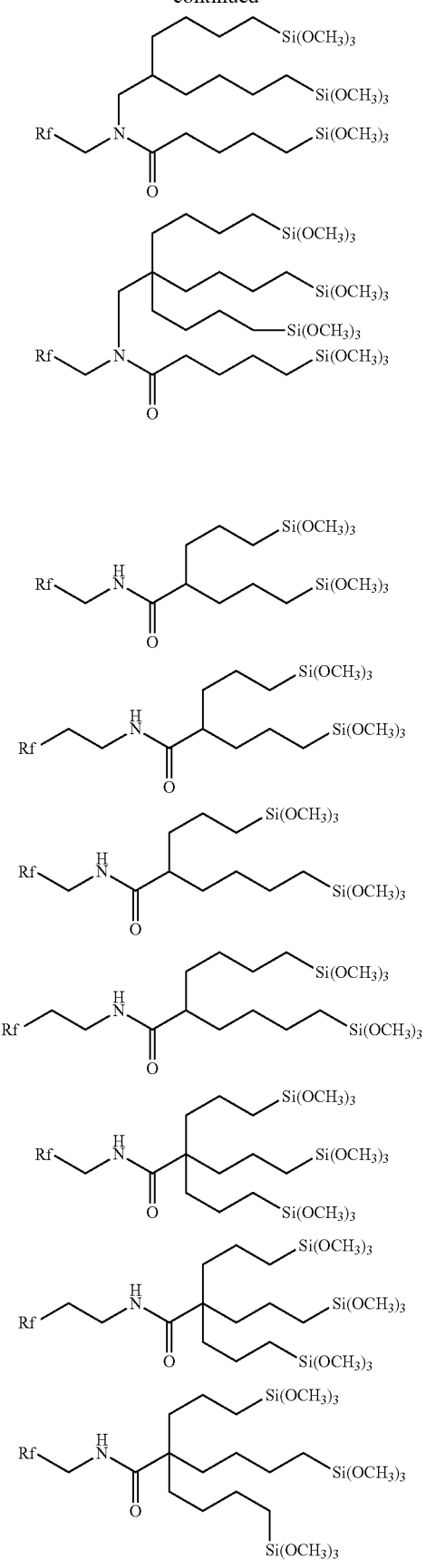

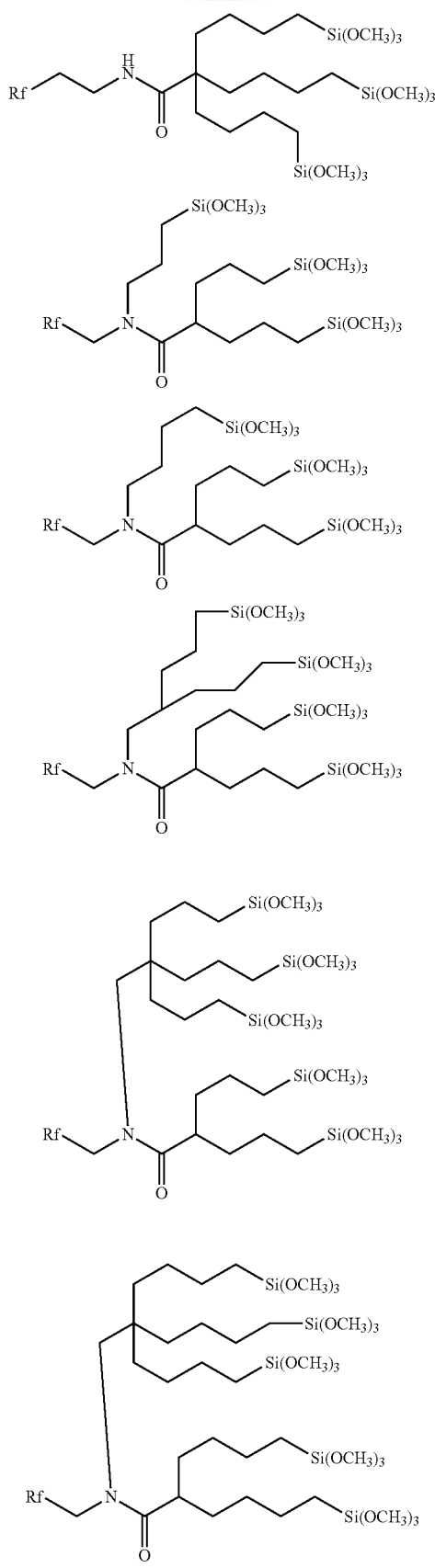
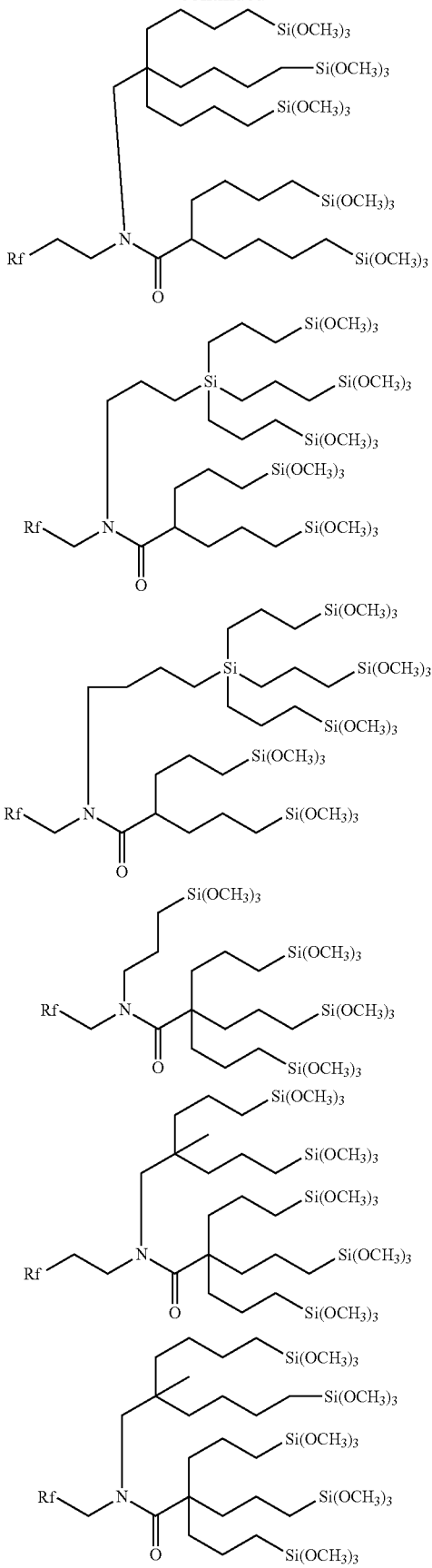

-continued
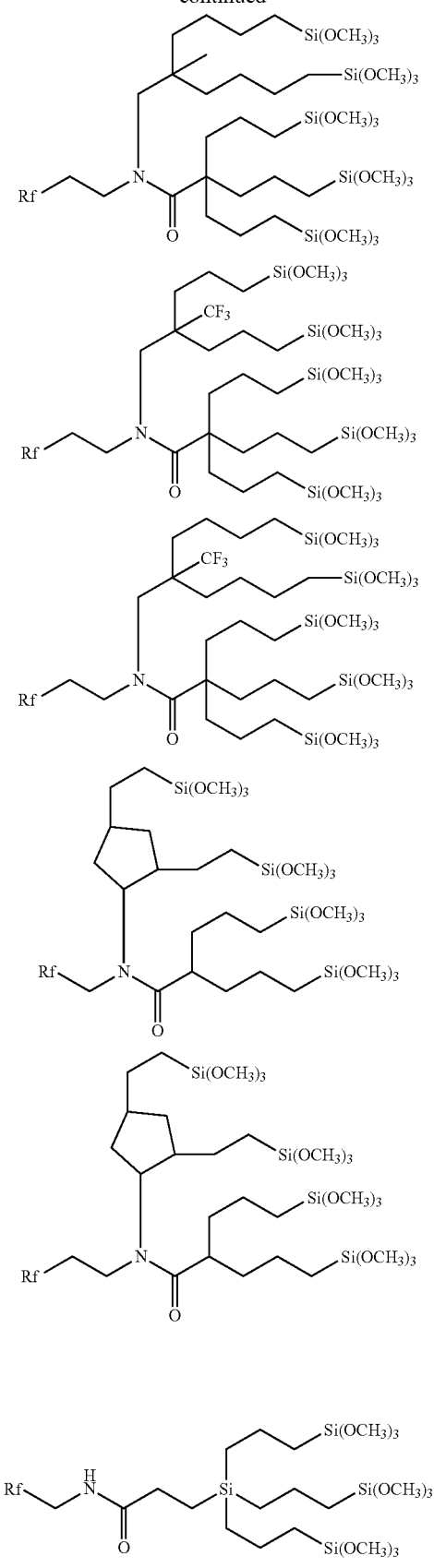
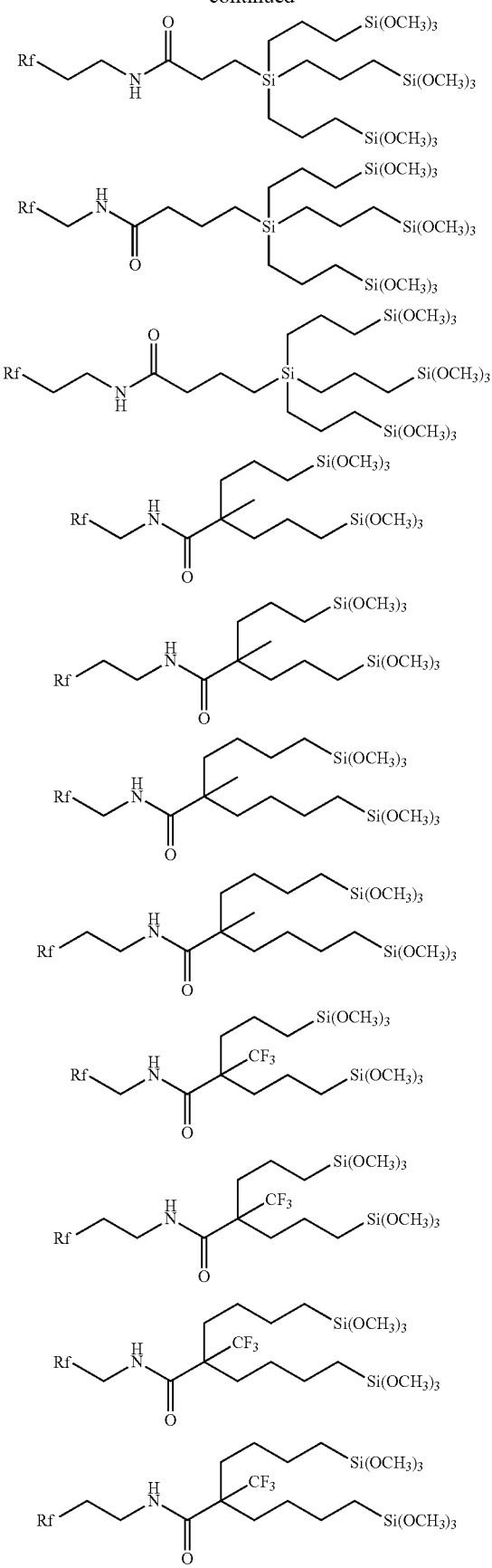

-continued
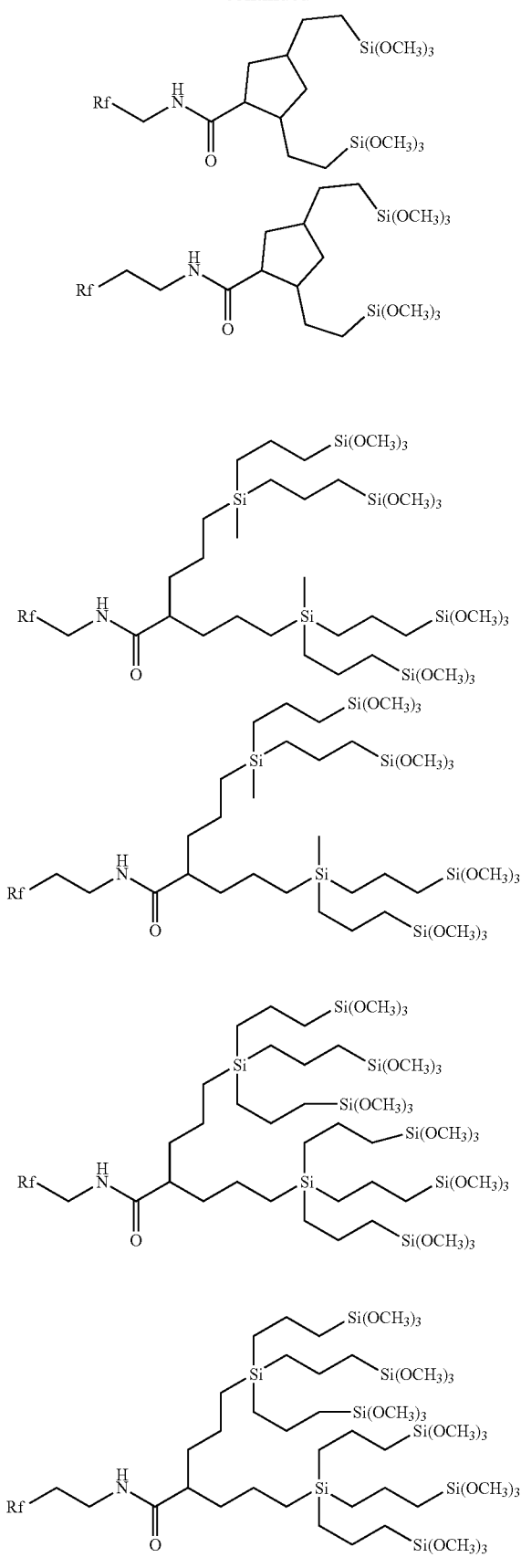
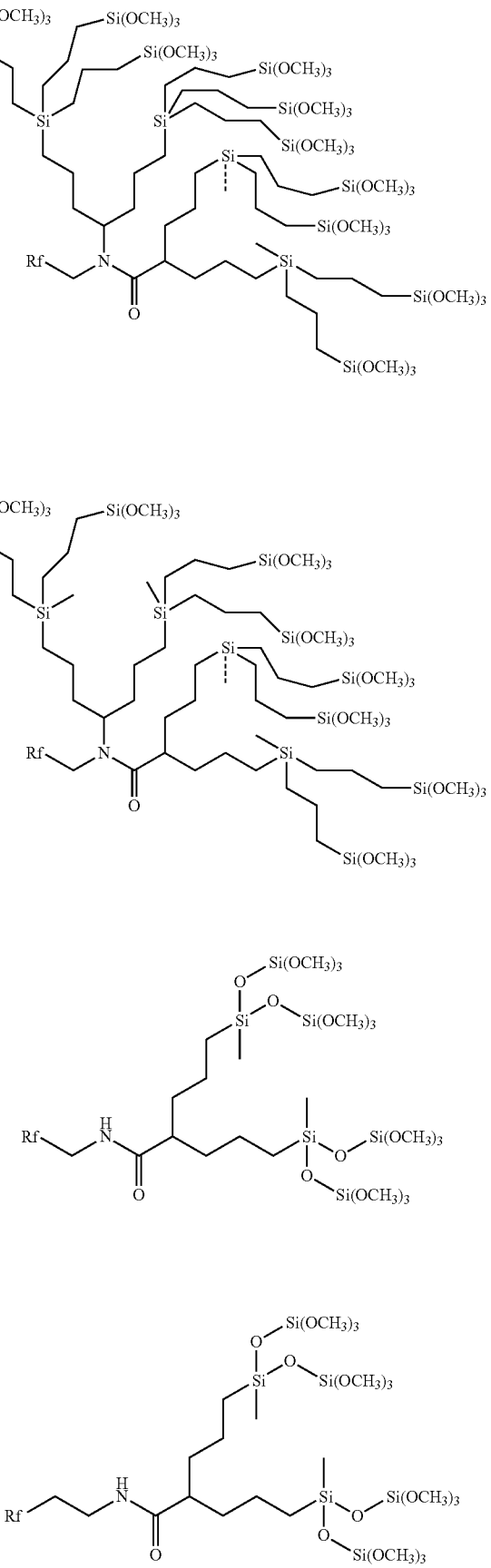

-continued

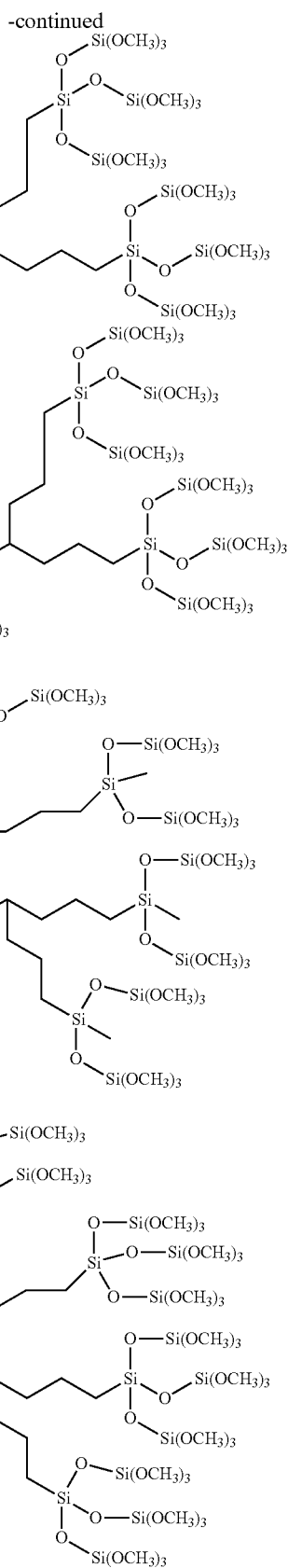

A preferred example of the compound (1) is a compound represented by the formula (1) wherein Z is a monovalent group represented by $R^{f1}$—$(OX)_m$—O—, X is a $C_{1-6}$ fluoroalkylene group, and $(OX)_m$ is composed of at least two different kinds of (OX) (hereinafter referred to as a "compound (1-X)"). Use of a compound (1-X) enables formation of a surface layer with higher abrasion resistance and water/oil repellency.

Another preferred example of the compound (1) is a compound represented by the formula (1) wherein Z is a bivalent group represented by —$(OX)_m$—O—, wherein X is a $C_{1-6}$ fluoroalkylene group, and $(OX)_m$ is composed of at least two different kinds of (OX) (hereinafter referred to as a "compound (1-Y)"). Use of a compound (1-Y) enables formation of a surface layer with higher abrasion resistance and water/oil repellency.

The compound (1-X) and compound (1-Y) preferably have an (OX) unit wherein X is a $C_5$ or $C_6$ perfluoroalkylene group (hereinafter referred to as a "unit α") and an (OX) unit wherein X is a $C_{1-4}$ perfluoroalkylene group (hereinafter referred to as a "unit β") as (OX) in the formula (1).

The unit α is preferably at least either of —$OCF_2CF_2CF_2CF_2CF_2$— and —$OCF_2CF_2CF_2CF_2CF_2CF_2$— in view of formation of a surface layer with higher abrasion resistance and water/oil repellency.

The unit β is at least either of —$OCF_2$— and —$OCF_2CF_2$— in view of formation of a surface layer with higher abrasion resistance and water/oil repellency.

When the compound (1-X) and the compound (1-Y) comprise a unit α and a unit β, the ratio of the number of units α to the total number of units α and units β (the number of units α/(the total number of and units α and units β)) is preferably from 0.002 to 0.5, particularly preferably from 0.005 to 0.2. When the ratio is within the above-mentioned range, the compound can form an abrasion resistant surface layer with high water/oil repellency.

The number of units is preferably 1 in view of formation of a surface layer with higher abrasion resistance and water/oil repellency.

When the compound (1-X) has a unit α and a unit β, it is preferred that no units α are present farther from $R^{f1}$ in $R^{f1}$—$(OX)_m$—O— as Z in the formula (1), than the [0.5×m]th (OX) unit from $R^{f1}$. Namely all units α are within the 1st to [0.5×m]th (OX) units provided that when m is an odd number, [0.5×m] is a natural number not larger than 0.5×m.

m in [0.5×m] is the same as m in $(OX)_m$.

[Composition]

The composition of the present invention (hereinafter referred to also as "the present composition (X)") comprises at least two kinds of the particular fluorinated ether compound or comprises at least one kind of the particular fluorinated ether compound and a fluorinated ether compound other than the particular fluorinated ether compound. The present composition (X) which comprises at least one kind of the particular fluorinated ether compound can form a light-resistant surface layer.

The present composition (X) may comprises a particular fluorinated ether compound having a group (A) (hereinafter referred to as a "particular fluorinated ether compound (A1)") and a particular fluorinated ether compound having two groups (A) (hereinafter referred to as a "particular fluorinated ether compound (A2)") in view of formation of a more light-resistant surface layer.

Each of the particular fluorinated ether compound (A1) and the particular fluorinated ether compound (A2) may be a single species or a combination of two or more species.

Examples of particular fluorinated ether compounds (A1) are those represented by the formula (1) wherein j is 1.

Examples of particular fluorinated ether compounds (A2) are those represented by the formula (1) wherein j is 2.

The present composition (X) may comprise a fluorinated ether compound other than the particular fluorinated ether compounds (hereinafter referred to as an "additional fluorinated ether compound").

The additional fluorinated ether compound may be a compound comprising a poly(oxyfluoroalkylene) chain and a reactive silyl group, which may have a group (A) so that the poly(oxyfluoroalkylene) chain is not located at the nitrogen end of the group (A).

The additional fluorinated ether compound may be a single species or a combination of two or more species.

The additional fluorinated ether compound is preferably a compound (2) in view of formation of a surface layer with higher abrasion resistance and water/oil repellency.

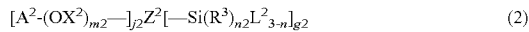

The definitions of $R^3$, $L^2$ and n2 in the formula (2) are the same as those of $R^2$, L and n in the formula (1), respectively.

The definitions of $X^2$ and m2 in the formula (2) are the same as those of X and m in $R^{f1}$—$(OX)_m$—O— as Z in the formula (1), respectively.

$A^2$ is a perfluoroalkyl group or $-Q^2[-Si(R^3)_{n2}L^2_{3-n2}]_{k2}$.

The number of the perfluoroalkyl group is preferably from 1 to 20, more preferably from 1 to 10, further preferably from 1 to 6, particularly preferably from 1 to 3, in view of formation of a more abrasion-resistant surface layer.

The perfluoroalkyl group may be linear or branched.

When A is $-Q^2[-Si(R^3)_{n2}L^2_{3-n2}]_{k2}$, j2 is 1.

The perfluoroalkyl group may, for example, be $CF_3$—, $CF_3CF_2$—, $CF_3CF_2CF_2$—, $CF_3CF_2CF_2CF_2$—, $CF_3CF_2CF_2CF_2CF_2$—, $CF_3CF_2CF_2CF_2CF_2CF_2$— or $CF_3CF(CF_3)$—.

The perfluoroalkyl group is preferably $CF_3$—, $CF_3CF_2$— or $CF_3CF_2CF_2$— in view of formation of a surface layer with higher water/oil repellency.

$Q^2$ is a (k2+1)-valent linking group. k2 is an integer of from 1 to 10, as described later. Therefore, $Q^2$ is a linking group having a valency of from 2 to 11.

$Q^2$ may, for example, be an alkylene group which may have an etheric oxygen atom or a bivalent organopolysiloxane residue, a carbon atom, a nitrogen atom, a silicon atom or a bivalent to octavalent organopolysiloxane residue, as long as the effect of the present invention is not impaired.

When $Q^2$ contains a group (A) represented by —NR—C(O)— (wherein R is a hydrogen atom or an alkyl group), the group (A) points its nitrogen end toward —[—Si(R^3)_{n2}L^2_{3-n2}]_{k2}.

$Z^2$ is a (j2+g2)-valent linking group.

$Z^2$ may, for example, be an alkylene group which may have an etheric oxygen atom or a bivalent organopolysiloxane residue, a carbon atom, a nitrogen atom, a silicon atom or a bivalent to octavalent organopolysiloxane residue, as long as the effect of the present invention is not impaired.

When $Z^2$ contains a group (A) represented by —NR—C(O)— (wherein R is a hydrogen atom or an alkyl group), the group (A) points its nitrogen end toward —[—Si(R^3)_{n2}L^2_{3-n2}]_{k2}.

j2 is an integer of at least 1, preferably an integer of from 1 to 5 in view of formation of a surface layer with higher water/oil repellency, particularly preferably 1 for easy production of a compound (2).

g2 is an integer of at least 1, preferably an integer of from 2 to 4, particularly preferably 3 in view of formation of an abrasion resistant surface layer.

Specific examples of the additional fluorinated ether compound include, for example, those disclosed in the following documents.

Perfluoropolyether-modified aminosilanes disclosed in JP-A-H11-029585 and JP-A-2000-327772, silicon-containing organic fluoropolymers disclosed in Japanese Patent No. 2874715 organic silicon compounds disclosed in JP-A-2000-144097, fluorinated siloxanes disclosed in JP-A-2002-506887, organic silicone compounds disclosed in JP-A-2008-534696, fluorination-modified hydrogenated polymers disclosed in Japanese Patent No. 4138936, compounds disclosed in US2010/0129672 A1, WO2014/126064 and JP-A-2014-070163, organosilicon compounds disclosed in WO2011/060047 and WO2011/059430, fluorinated organosilane compound disclosed in WO2012/064649, fluorooxyalkylene group-containing polymers disclosed in JP-A-2012-72272, fluorinated ether compounds disclosed in WO2013/042732, WO2013/121984, WO2013/121985, WO2013/121986, WO2014/163004, JP-A-2014-080473, WO2015/087902, WO2017/038830, WO2017/038832, WO2017/187775, WO2018/216630, WO2019/039186, WO2019/039226, WO2019/039341, WO2019/044479, WO2019/049753, WO2019/163282 and JP-A-2019-044158, silane compounds containing perfluoro(poly)ether disclosed in JP-A-2014-218639, WO2017/022437, WO2018/079743 and WO2018/143433, silane compounds containing a perfluoro(poly)ether group disclosed in WO2018/169002, silane compounds containing a fluoro(poly)ether group disclosed in WO2019/151442, silane compounds containing a (ply)ether group disclosed in WO2019/151445, perfluoropolyether group-containing compounds disclosed in WO2019/098230, fluoropolyether group-containing polymer modified silanes disclosed in JP-A-2015-199906, JP-A-2016-204656, JP-A-2016-210854 and JP-A-2016-222859, and fluorinated compounds disclosed in WO2019/039083 and WO2019/049754.

As the additional fluorinated compound, commercial products such as KY-100 series (such as KY-178, KY-185 and KY-195) manufactured by Shin-Etsu Chemical Co., Ltd., Afluid (registered trademark) S550 manufactured by AGC Inc., and OPTOOL (registered trademark) DSX, OPTOOL (registered trademark) AES, OPTOOL (registered trademark) UF503 and OPTOOL (registered trademark) UD509 manufactured by DAIKIN INDUSTRIES, LTD., are available.

The content of a particular fluorinated ether compound is preferably from 50 to 100 mass %, particularly preferably from 80 to 100 mass %, relative to the total mass of the present composition (X).

When the present composition (X) comprises a particular fluorinated ether compound (A1) and a particular fluorinated ether compound (A2), the mass ratio of the content of the particular fluorinated ether compound (A2) to the content of the particular fluorinated ether compound (A1) (the particular fluorinated ether compound (A2)/the particular fluorinated ether compound (A1)) is preferably higher than 0 and at most 100, particularly preferably higher than 0 and at most 20.

When the present composition (X) comprises an additional fluorinated ether compound, the mass ratio of the content of the particular fluorinated ether compound(s) to the additional fluorinated ether compound (the particular fluorinated ether compound(s)/the additional fluorinated ether compound) is preferably higher than 0 and at most 50, particularly preferably higher than 0 and at most 10.

<Coating Composition>

The particular fluorinated ether compound and the present composition (X) can be used by itself (in dry coating as described layer) or in the form of a composition comprising other components as well (in dry coating or a wet coating as described later). A coating composition comprising other components in the latter case will be referred to also as a composition (Y).

As a composition (Y), a composition comprising a particular fluorinated ether compound or the present composition (X), and a liquid medium may be mentioned. The liquid medium may, for example, be water or an organic solvent.

The liquid medium preferably comprises an organic solvent, more preferably an organic solvent having a boiling point of from 35 to 250° C., in view of easy application. The boiling point herein means a normal boiling point.

The organic solvent may, for example, be a fluorinated solvent or a non-fluorinated organic solvent and is preferably a fluorinated organic solvent for its high solvency. The organic solvent may be a single species or a combination of two or more species.

The fluorinated organic solvent may, for example, be a fluorinated alkane, a fluorinated aromatic compound, a fluoroalkyl ether, a fluorinated alkylamine or a fluoroalcohol.

The fluorinated alkane is preferably a $C_{4-8}$ compound such as $C_8F_{13}H$ (AC-2000: product name, manufactured by AGC Inc.), $C_6F_{13}C_2H_5$ (AC-6000: product name, manufactured by AGC Inc.), $C_2F_5CHFCHFCF_3$ (Vertrel: product name, manufactured by DuPont).

The fluorinated aromatic compound may, for example, be hexafluorobenzene, trifluoromethylbenzene, perfluorotoluene, 1,3-bis(trifluoromethyl)benzene, or 1,4-bis(trifluoromethyl)benzene.

The fluoroalkyl ether is preferably a $C_{4-12}$ compound such as $CF_3CH_2OCF_2CF_2H$ (AE-3000: product name, manufactured by AGC Inc.), $C_4F_9OCH_3$ (Novec-7100: product name, manufactured by 3M), $C_4F_9OC_2H_5$ (Novec-7200: product name, manufactured by 3M) and $C_2F_5CF(OCH_3)C_3F_7$ (Novec-7300: product name, manufactured by 3M).

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The non-fluorinated organic solvent is preferably a compound composed solely of hydrogen atoms and carbon atoms or a compound composed solely of hydrogen atoms, carbon atoms and oxygen atoms, and may, for example, be a hydrocarbon organic solvent, a ketone organic solvent, an ether organic solvent, an ester organic solvent or an alcohol organic solvent.

The hydrocarbon solvent may, for example, be hexane, heptane or cyclohexane.

The ketone organic solvent may, for example, be acetone, methyl ethyl ketone or methyl isobutyl ketone.

The ether organic solvent may, for example, be diethyl ether, tetrahydrofuran or tetraethylene glycol dimethyl ether.

The ester organic solvent may, for example, be ethyl acetate or butyl acetate.

The alcohol organic solvent may, for example, be isopropyl alcohol, ethanol or n-butanol.

When the composition (Y) comprises a liquid medium, the content of the liquid medium is preferably from 70 to 99.99 mass %, particularly preferably from 80 to 99.9 mass %, relative to the total mass of particular fluorinated ether compound(s) or the present composition (X).

The composition (Y) may contain additional components other than the liquid medium as long as they do not impair the effects of the present invention.

Such additional components may, for example, be compounds which inevitably accompany particular fluorinated ether compounds or additional fluorinated ether compounds as a result of their production, such as by-products formed during their production or unreacted raw materials.

Further, additives such as an acid catalyst or a basic catalyst to promote hydrolysis and condensation reaction of the hydrolyzable silyl group may be mentioned. The acid catalyst may, for example, be hydrochloric acid, nitric acid, acetic acid, sulfuric acid, phosphoric acid, sulfonic acid, methanesulfonic acid or p-toluenesulfonic acid. The basic catalyst may, for example, be sodium hydroxide, potassium hydroxide or ammonia.

The content of additional component is preferably from 0 to 10 mass %, more preferably from 0 to 5 mass %, particularly preferably from 0 to 1 mass %, relative to the particular fluorinated ether compound in the composition (Y).

[Article]

The article of the present invention comprises a substrate and a surface layer formed from the particular fluorinated compound or the present composition (X) on the substrate.

The surface layer contains a compound resulting from hydrolysis and condensation of the particular fluorinated ether compound.

The thickness of the surface layer is preferably from 1 to 100 nm, particularly preferably from 1 to 50 nm. A surface layer not thinner than the lower limit of the above-mentioned range has sufficient effect. It is economical that the surface layer is not thicker than the upper limit of the above-mentioned range.

The thickness of the surface layer can be calculated from the oscillation period of an interference pattern of reflected X-ray measured by X-ray reflectometry (XRR) with a thin film X-ray diffractometer.

The substrate is preferably a substrate which can be touched with a human finger or another article (such as a stylus) for use, a substrate which can be held in a human hand for operation, and/or a substrate which can be placed on another article (such as a holder). Because formation of the surface layer imparts water/oil repellency, a substrate which requires water/oil repellency is particularly preferred. The material for the substrate may, for example, be a metal, resin, glass, sapphire, ceramics, stone or a composite material thereof. The glass may be chemically tempered glass.

The substrate is preferably a touch panel substrate or a display substrate, particularly preferably a touch panel substrate. The material for the touch panel substrate is preferably a light-transmitting material. By "light-transmitting", a visible light transmission of at least 25% at the normal incident angle, measured in accordance with JIS R3106: 1998 (ISO9050: 1990), is meant The material for the touch panel substrate is preferably glass or transparent resin.

Examples of the substrate include building materials, decoration materials, interior goods, vehicles (such as automobiles), signboards and bulletin boards, food and drink utensils, aquariums, display containers (such as art frames and boxes), laboratory ware, furniture, and glass and plastic parts of art, sports and game goods. As a substrate, also preferred is a glass or plastic part used as an exterior part of a mobile phone (such as a smartphone), a personal digital assistant, a remote controller or other devices. The substrate may be in the shape of a plate or film.

The surface layer may be formed on the surface of a substrate directly or via another film formed on the surface of a substrate, such as an undercoat formed on a substrate by treatment with a compound disclosed in paragraphs 0089 to 0095 of WO2011/016458 or $SiO_2$ as a primer.

The article may be produced, for example, by the following methods.

A method for producing the article, which comprises treating the surface of a substrate with a particular fluorinated compound or the present composition (X) by dry coating.

A method for producing the article, which comprises applying a composition (Y) containing a liquid medium to the surface of a substrate by wet coating and drying the composition.

In the case of wet coating, a particular fluorinated ether compound may be hydrolyzed preliminarily with an acid catalyst or a basic catalyst, and a composition comprising the resulting hydrolysate and a liquid medium may be used.

As dry coating techniques, vacuum vapor deposition, CVD, sputtering or the like may be mentioned. With a view to suppressing decomposition of a particular fluorinated ether compound and in view of simplicity of apparatus, vacuum vapor deposition is suitable. In vacuum deposition, a porous metal such as iron or steel in the form of pellets impregnated with a composition (Y) containing a liquid medium may be used after drying.

As techniques for wet coating, spin coating, wipe coating, spray coating, squeegee coating, dip coating, die coating, ink-jet coating, flow coating, roll coating, casting, a Langmuir-Blodgett deposition, gravure coating or the like may be mentioned.

EXAMPLES

Now, the present invention will be described in further detail with reference to Examples, but the present invention is not limited to these Examples. The amounts of the respective components i are based on mass. Among Ex. 1 to 16, Ex. 1 to 12 are Examples of the present invention, and Ex. 13 to 16 are Comparative Examples.

[Evaluation Methods]
(Method for Measuring Water Contact Angle)

A contact angle of about 2 μL of distilled water with a surface layer was measured with a contact angle meter (DM-500: product name, manufactured by Kyowa Interface Science Co., Ltd.). Measurements are made at five different locations on the surface of the surface layer and averaged. For the calculation of the contact angle, the 2θ method was used. The scale for evaluations is given below.
  ○ (good): an initial contact angle of at least 100°
  × (poor): an initial contact angle of less than 100°
(Method for Light Resistance Test)

A surface layer was irradiated with light rays (650 W/m2, 300 to 700 nm) for 2,000 hours at a black panel temperature of 63° C. by means of a tabletop accelerated light fastness tester equipped with a xenon arc lamp (SUNTEST XLS+: product name, manufactured by Toyo Seiki Seisaku-sho, Ltd.), and then the water contact angle of the surface layer was measured as described above.

If the decrease in water contact angle observed after the accelerated light fastness test is small, the surface layer is excellent in light resistance with little damage to its performance by the light. The scale for evaluations is given below.
  ○ (good): The water contact angle had changed by at most 5° after the accelerated light fastness test.
  × (poor): The water contact angle had changed by more than 5° after the accelerated light fastness test.

Synthetic Example 1-1

Compound (A-1) was prepared in accordance with Example 2 (specifically Example 2-3) in WO2013/121984.

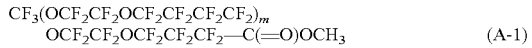

Mean value of m: 13

Synthetic Example 1-2

In a 100 mL pressure reactor, 15 g of compound (A-1), 50 g of ASAHIKLIN AK-225 (product name, manufactured by AGC Inc.) and 7.5 g of 2.0 M ammonia-methanol were stirred at room temperature for 6 hours, and then the solvent was distilled to obtain 14.8 g (yield: 99%) of compound (A-2) as the desired product.

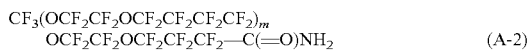

NMR Spectrum of Compound (A-2)
$^{19}$F-NMR: −55 (3F), −82 (53F), −87 (53F), −90 (2F), −119 (2F), −123 to −128 (55F)

Synthetic Example 1-3

In a 300 mL recovery flask, 15 g of compound (A-2), 75 g of AK-225 and 30 g of diethyl ether were stirred on an ice bath. Then, 0.31 g of lithium aluminum hydride was gradually added, and the reaction mixture was stirred at room temperature for 30 hours. Then, 0.3 mL of saturated aqueous sodium sulfate was added, and the precipitated solid was removed by filtration through Celite, and the filtrate was concentrated and purified by silica gel column chromatography to obtain 6.8 g (yield: 45%) of compound (A-3) as the desired product.

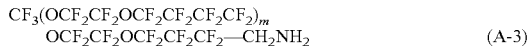

NMR Spectrum of Compound (A-3)
$^{1}$H-NMR: 3.2 (2H)
$^{19}$F-NMR: −55 (3F), −82 (59F), −87 (59F), −90 (2F), −122 (2F), −123 to −128 (61F)

Synthetic Example 1-4

In a 50 mL recovery flask, 0.2 g of HO(C=O)C(CH$_2$CH=CH$_2$)$_3$, 10 mL of dichloromethane and 0.2 mL of oxalyl chloride were stirred under cooling with ice, and then 0.0118 g of DMF (N,N-dimethylformamide) was added. The reaction mixture was stirred at room temperature for 3 hours and concentrated to obtain 0.18 g of Cl(C=O)C(CH$_2$CH=CH$_2$)$_3$.

Separately, into a 50 mL recovery flask, 3.0 g of compound (A-3) and 0.35 mL of triethylamine were loaded, and Cl(C=O)C(CH$_2$CH=CH$_2$)$_3$ obtained above and 2 mL of 1,3-bistrifluoromethylbenzene were added. The reaction mixture was stirred for 1 hour, and the solvent was distilled off. The resulting crude product was purified by silica gel column chromatography to obtain 1.7 g (yield: 54%) of compound (A-4) as the desired product.

$CF_3(OCF_2CF_2OCF_2CF_2CF_2CF_2)_m$
$OCF_2CF_2OCF_2CF_2CF_2$—$CH_2NH(C=O)C$
$(CH_2CH=CH_2)_3$ (A-4)

NMR Spectrum of Compound (A-4)
$^1$H-NMR: 6.1 (1H), 5.8 (3H), 5.2 (6H), 4.1 (2H), 2.4 (6H)
$^{19}$F-NMR: −55 (3F), −82 (49F), −87 (51F), −120 (2F), −126 (49F)

Synthetic Example 1-5

Into a 50 mL recovery flask flushed with nitrogen, 1.0 g of compound (A-4), 0.003 g of a xylene solution of platinum/1,3-divinyl-1,1,3,3-tetramethyldisiloxane complex (platinum content: 3 mass %), 0.0009 g of aniline and 1.0 g of AC-6000 (product name, manufactured by AGC Inc.) were loaded, and stirred with 0.11 g of trimethoxysilane at 40° C. for 4 hours. Then, the same amounts of a xylene solution of platinum/1,3-divinyl-1,1,3,3-tetramethyldisiloxane complex (platinum content: 3 mass %), aniline and AC-6000 were further added, and the reaction mixture was stirred for 7 hours. The solvent was distilled off to obtain 1.1 g (yield: 95%) of compound (1-A).

$CF_3(OCF_2CF_2OCF_2CF_2CF_2CF_2)_m$
$OCF_2CF_2OCF_2CF_2CF_2$—$CH_2NH(C=O)C$
$[CH_2CH_2CH_2Si(OCH_3)_3]_3$ (1-A)

NMR Spectrum of Compound (1-A)
$^1$H-NMR: 6.0 (1H), 4.1 (2H), 3.6 (27H), 1.7 (6H), 1.4 (6H), 0.7 (6H)
$^{19}$F-NMR: −55 (3F), −82 (49F), −87 (51F), −120 (2F), −126 (49F)
m was about 13.

Synthetic Example 2

Compound (1-B) was obtained in the same manner as in Synthetic Example 1 except that HO(C=O)C(CH$_2$CH=CH$_2$)$_3$ was changed to HO(C=O)CH(CH$_2$CH=CH$_2$)$_2$.

$CF_3(OCF_2CF_2OCF_2CF_2CF_2CF_2)_m$
$OCF_2CF_2OCF_2CF_2CF_2$—$CH_2NH(C=O)CH$
$[CH_2CH_2CH_2Si(OCH_3)_3]_2$ (1-B)

m was about 13.

Synthetic Example 3

Compound (C-1) was prepared in accordance with Example 1 (specifically Examples 1-1 to 1-4) in WO2017/038830.

$CF_3CF_2CF_2(OCF_2CF_2)(OCF_2CF_2)\{(OCF_2)_n$
$(OCF_2CF_2)_p\}OCF_2C(=O)OCH_3$ (C-1)

n was about 21, and p was about 20.

Synthetic Example 3-1

Compound (1-C) was obtained in the same manner as in Synthetic Example 1 except that compound (A-1) was changed to compound (C-1).

$CF_3CF_2CF_2(OCF_2CF_2)(OCF_2CF_2)\{(OCF_2)_n$
$(OCF_2CF_2)_p\}OCF_2CH_2NH(C=O)C$
$[CH_2CH_2CH_2Si(OCH_3)_3]_3$ (1-C)

n was about 21, and p was about 20.

Synthetic Example 4

Compound (1-D) was obtained in the same manner as in Synthetic Example 2 except that HO(C=O)C(CH$_2$CH=CH$_2$)$_3$ was changed to HO(C=O)CH(CH$_2$CH=CH$_2$)$_2$.

$CF_3CF_2CF_2(OCF_2CF_2)(OCF_2CF_2)\{(OCF_2)_n$
$(OCF_2CF_2)_p\}OCF_2CH_2NH(C=O)CH$
$[CH_2CH_2CH_2Si(OCH_3)_3]_2$ (1-D)

n was about 21, and p was about 20.

Synthetic Example 5

Synthetic Example 5-1

In a 200 mL recovery flask, 16.2 g of HO—CH$_2$CF$_2$CF$_2$CH$_2$—OH and 13.8 of potassium carbonate were stirred at 120° C. After addition of 278 g of CF$_2$=CFO—CF$_2$CF$_2$CF$_2$CH$_2$OH obtained in accordance with Example 1-1 in WO2013/121984, the reaction mixture was stirred at 120° C. for another 2 hours and then allowed to cool to 25° C. and partitioned between 50 g of AC-2000 (product name, manufactured by AGC Inc., C$_6$F$_{13}$H) and 50 g of hydrochloric acid. The organic layer was concentrated, and the resulting crude reaction solution was purified by column chromatography to obtain 117.7 g (yield: 40%) of compound (E-2).

(E-2)

NMR Spectrum of Compound (E-2)
$^1$H-NMR (300.4 MHz, solvent: CDCl$_3$, standard: tetramethylsilane (TMS)) δ (ppm): 6.0 (12H), 4.6 (20H), 4.2 (4H), 4.1 (4H).
$^{19}$F-NMR (282.7 MHz, solvent: CDCl$_3$, standard: CFCl$_3$) δ (ppm): −85 (24F), −90 (24F), −120 (20F), −122 (4F), −123 (4F), −126 (24F), −144 (12F)

The mean value of m+n was 10.

Synthetic Example 5-2

In a 50 mL recovery flask connected to a reflux condenser, 20 g of compound (E-2), 2.4 g of sodium fluoride powder and 20 g of AC-2000, 18.8 g of CF$_3$CF$_2$CF$_2$OCF(CF$_3$)COF were stirred at 50° C. for 24 hours in a nitrogen atmosphere, and allowed to cool to room temperature. The sodium fluoride powder was removed by pressure filtration, and the excess CF$_3$CF$_2$CF$_2$OCF(CF$_3$)COF and AC-2000 were distilled off to obtain 24 g (yield: 100%) of compound (E-3).

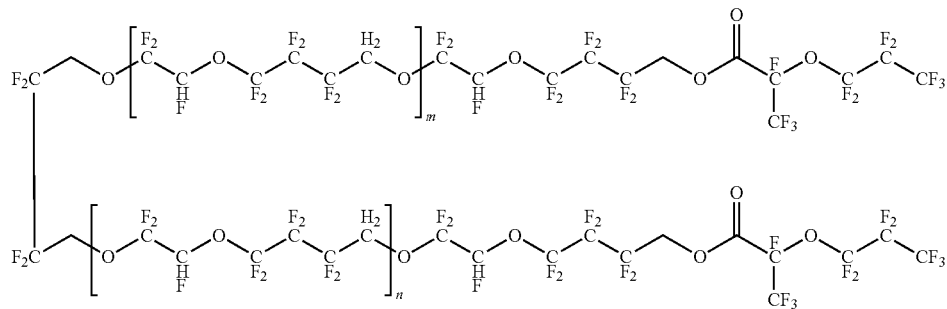

NMR Spectrum of Compound (E-3)

$^1$H-NMR (300.4 MHz, solvent: CDCl$_3$, standard: tetramethylsilane (TMS)) δ (ppm): 6.0 (12H), 4.6 (20H), 4.2 (4H), 4.1 (4H).

$^{19}$F-NMR (282.7 MHz, solvent: CDCl$_3$, standard: CFCl$_3$) δ (ppm): −85 (24F), −90 (24F), −120 (20F), −122 (4F), −123 (4F), −126 (24F), −144 (12F)

The mean value of m+n was 10.

Synthetic Example 5-3

In a 500 mL nickel reactor, 250 mL of ClCF$_2$CFClCF$_2$OCF$_2$CF$_2$Cl (hereinafter referred to as "CFE-419") was loaded and bubbled with nitrogen gas. After a sufficient drop in oxygen concentration, it was bubbled with fluorine gas diluted with nitrogen to 20 vol % for 1 hour. A solution of compound (E-3) in CFE-419 (concentration: 10 mass %, compound (E-3): 24 g) was added over 6 hours, while fluorine gas was fed so that the ratio of the feed rate (mol/h) of the fluorine gas to the feed rate (mol/h) of hydrogen atoms from the compound (E-3) would be 2:1. After addition of compound (E-3), a solution of benzene in CFE-419 (concentration: 0.1 mass %, benzene: 0.1 g) was added in portions. After the addition of benzene, the reaction mixture was bubbled with fluorine gas for 1 hour, and the reactor was flushed with nitrogen gas sufficiently. The solvent was distilled off to obtain 25.3 g of compound (E-4) (yield: 90%).

CF$_3$CF$_2$CF$_2$—OCF(CF$_3$)—C(=O)—O—
CF$_2$CF$_2$CF$_2$CF$_2$—(OCF$_2$CF$_2$—
OCF$_2$CF$_2$CF$_2$CF$_2$)$_l$—OCF$_2$CF$_2$—
OCF$_2$CF$_2$CF$_2$CF$_2$—O—C(=O)—CF(CF$_3$)O—
CF$_2$CF$_2$CF$_3$  (E-4)

NMR Spectrum of Compound (E-4)

$^{19}$F-NMR (282.7 MHz, solvent: CDCl$_3$, standard: CFCl$_3$) δ (ppm): −79 (4F), −81 (6F), −82 (6F), −83 (48F), −87 (44F), −124 (48F), −129 (4F), −131 (2F).

The mean value of l was 10.

Synthetic Example 5-4

In a 50 mL recovery flask, 25.3 g of compound (E-4), 2.2 g of sodium fluoride and 25 mL of AC-2000 were stirred on an ice bath. 1.7 g of methanol was added, and then the reaction mixture was stirred at 25° C. for 1 hour. The reaction mixture was filtered, and the filtrate was purified by column chromatography to obtain 15 g of compound (E-5) (yield: 80%).

CH$_3$—O—C(=O)—CF$_2$CF$_2$CF$_2$—(OCF$_2$CF$_2$—
OCF$_2$CF$_2$CF$_2$CF$_2$)$_l$—OCF$_2$CF$_2$—
OCF$_2$CF$_2$CF$_2$—C(=O)—O—CH$_3$  ((E-5)

NMR Spectrum of Compound (E-5)

$^1$H-NMR (300.4 MHz, solvent: CDCl$_3$, standard: tetramethylsilane (TMS)) δ (ppm): 4.2 (6H).

$^{19}$F-NMR (282.7 MHz, solvent: CDCl$_3$, standard: CFCl$_3$) δ (ppm): −83 (44F), −87 (44F), −119 (4F), −124 (44F).

Synthetic Example 5-5

In a 100 mL pressure reactor, 15 g of compound (E-5), 50 g of AK-225 and 7.5 g of 2.0 M ammonia-methanol solution were stirred at room temperature for 6 hours. The solvent was distilled off to obtain 15.0 g of compound (E-6) as the desired product (yield: 100%).

H$_2$NC(=O)CF$_2$CF$_2$CF$_2$—(OCF$_2$CF$_2$—
OCF$_2$CF$_2$CF$_2$CF$_2$)$_l$—OCF$_2$CF$_2$—
OCF$_2$CF$_2$CF$_2$C(=O)NH$_2$  (E-6)

NMR Spectrum of Compound (E-6):

$^{19}$F-NMR: −83 (44F), −87 (44F), −120 (4F), −124 (44F)

Synthetic Example 5-6

In a 300 mL recovery flask, 15 g of compound (E-6), 75 g of AK-225 and 30 g of diethyl ether were stirred under cooling with ice. Then, 0.70 g of lithium aluminum hydride was gradually added, and the reaction mixture was stirred at room temperature for 20 hours. 0.3 mL of aqueous saturated sodium sulfate was added, and the precipitated solid was removed by filtration through Celite. The filtrate was concentrated and purified by silica gel column chromatography to obtain 9.8 g (yield: 65%) of compound (E-7) as the desired product.

H$_2$NCH$_2$CF$_2$CF$_2$CF$_2$—(OCF$_2$CF$_2$—
OCF$_2$CF$_2$CF$_2$CF$_2$)$_l$—OCF$_2$CF$_2$—
OCF$_2$CF$_2$CF$_2$CH$_2$NH$_2$  (E-7)

NMR Spectrum of Compound (E-7)

$^1$H-NMR: 3.2 (4H)

$^{19}$F-NMR: −83 (44F), −87 (44F), −122 (4F), −124 (44F)

Synthetic Example 5-7

In a 50 mL recovery flask, 0.5 g of HO(C=O)C(CH$_2$CH=CH$_2$)$_3$, 20 mL of dichloromethane and 0.5 mL of oxalyl chloride were stirred under cooling with ice, and then 0.01 g of DMF was added. The reaction mixture was stirred at room temperature for 3 hours and concentrated to obtain 0.45 g of Cl(C=O)C(CH$_2$CH=CH$_2$)$_3$.

Separately, into a 50 mL recovery flask, 3.0 g of compound (E-7) and 0.7 mL of triethylamine were loaded, and Cl(C=O)C(CH$_2$CH=CH$_2$)$_3$ obtained above and 2 mL of 1,3-bistrifluoromethylbenzene were added. The reaction mixture was stirred for 1 hour, and the solvent was distilled off. The resulting crude product was purified by silica gel column chromatography to obtain 2.2 g (yield: 70%) of compound (E-8).

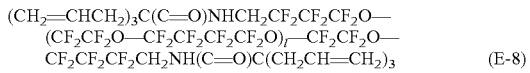

(E-8)

NMR Spectrum of Compound (E-8):
$^1$H-NMR: 6.1 (2H), 5.8 (6H), 5.2 (12H), 4.1 (4H), 2.4 (12H)
$^{19}$F-NMR: −83 (44F), −87 (44F), −120 (4F), −124 (44F)

Synthetic Example 5-8

Into a 50 mL recovery flask flushed with nitrogen, 1.0 g of compound (E-8), 0.003 g of a xylene solution of platinum/1,3-divinyl-1,1,3,3-tetramethyldisiloxane complex (platinum content: 3 mass %), 0.001 g of aniline and 1.0 g of AC-6000 were loaded and stirred with 0.21 g of trimethoxysilane at 40° C. overnight. Then, the solvent was distilled off to obtain 1.2 g (yield: 100%) of compound (1-E).

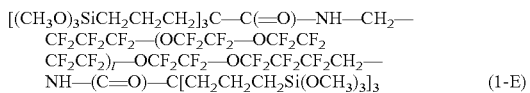

(1-E)

NMR spectrum of compound (1-E):
$^1$H-NMR: 6.0 (2H), 4.1 (4H), 3.6 (54H), 1.7 (12H), 1.4 (12H), 0.7 (12H)
$^{19}$F-NMR: −83 (44F), −87 (44F), −120 (4F), −124 (44F)
The mean value of l was 10.

Synthetic Example 6

Synthetic Example 6-1

Compound (F-1) was prepared in accordance with Example 1-1 in WO2013-121984.

$$CF_2=CFO-CF_2CF_2CF_2CH_2OH \quad (F-1)$$

Synthetic Example 6-2

In a 100 mL stainless steel reactor, 10 g of compound (F-1) was stirred at 175° C. for 200 hours. The resulting organic phase was concentrated to obtain 6 g of compound (F-2).

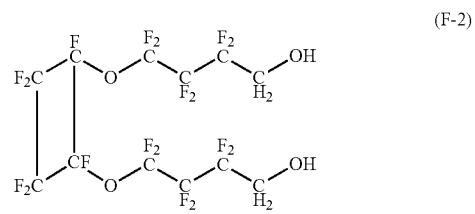

(F-2)

NMR spectrum of compound (F-2):
$^1$H-NMR (300.4 MHz, solvent: CDCl$_3$, standard: tetramethylsilane (TMS)) δ (ppm): 4.1 (4H).
$^{19}$F-NMR (282.7 MHz, solvent: CDCl$_3$, standard: CFCl$_3$) δ (ppm): −80 (2F), −85 (2F), −123 (4F), −126 (4F), −128 (2F), −131 (2F), −137 (1F), −139 (1F)

Synthetic Example 6-3

Compound (1-F) was obtained in the same manner as in Synthetic Example 1 except that HO—CH$_2$CF$_2$CF$_2$CH$_2$—OH was changed compound (F-2).

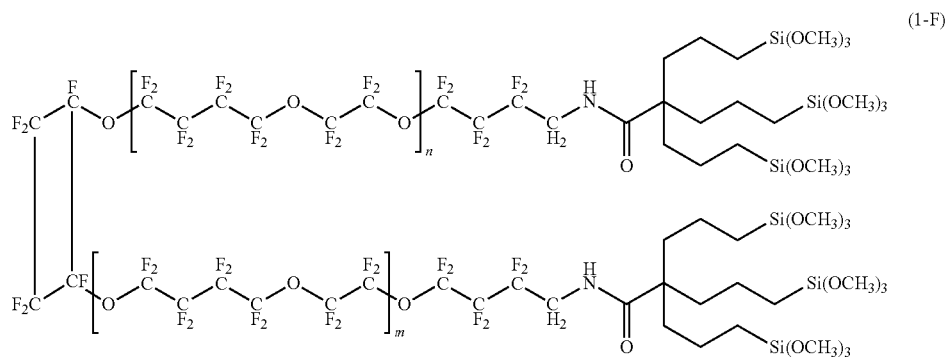

(1-F)

In the formula (1-F), the mean value of m+n was 10.

Synthetic Example 7-1

Compounds (G-1) and (1-1) were prepared in accordance with Synthetic Examples 1 to 4 in Japanese Patent No. 6024816.

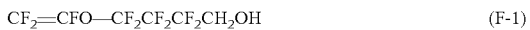

Compound (G-1): compound of the above formula wherein the mean value of x1 is 42, and the mean value of x2 is 10
Compound (I-1): compound of the above formula wherein the mean value of x1 is 26, and the mean value of x2 is 22

Synthetic Example 7-2

Compound (G-2) was prepared in accordance with Ex. 13-1 to Ex. 13-2 in WO2018/216630.

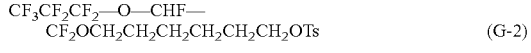

(G-2)

(wherein OTs represents —O—SO$_2$-Ph-CH$_3$, and Ph represents a phenylene group)

Synthetic Example 7-3

Into a 300 mL three-necked flask, 4 g of compound (G-1) and 160 g of 1,3-bis(trifluoromethyl)benzene were loaded, and 12 g of cesium carbonate was added. The reaction mixture was stirred in a nitrogen atmosphere at 70° C. The solid was filtered out, and the filtrate was washed with water. The organic layer was recovered, concentrated and purified by silica gel column chromatography to obtain 12 g of the compound (G-3).

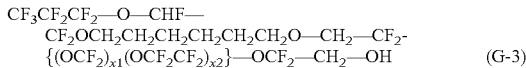
(G-3)

NMR Spectrum of Compound (G-3):
$^1$H-NMR (300.4 MHz, solvent: CDCl$_3$, standard: TMS) δ (ppm): 1.3 (4H), 1.7 (4H), 2.5 (1H), 3.5 (2H), 3.8 (2H), 4.0 (2H), 4.2 (2H), 5.8 (1H).
$^{19}$F-NMR (282.7 MHz, solvent: CDCl$_3$, standard: CFCl$_3$) δ (ppm): −52 to −56 (84F), −79 (1F), −80 (1F), −81 (1F), −82 (3F), −84 (1F), −85 to −88 (2F), −89 to −91 (40F), −130 (2F), −146 (1F).
The mean value of x1: 42, the mean value of x2: 10.

Synthetic Example 7-4

Into a 100 ml recovery flask, 12 g of compound (G-3) and 2.3 g of sodium fluoride powder were loaded, and 11 g of CF$_3$CF$_2$CF$_2$OCF(CF$_3$)C(O)F was added. The reaction mixture was stirred in a nitrogen atmosphere. The sodium fluoride powder was removed by filtration, and the excess CF$_3$CF$_2$CF$_2$OCF(CF$_3$)C(O)F was distilled off to obtain 12 g of compound (G-4).

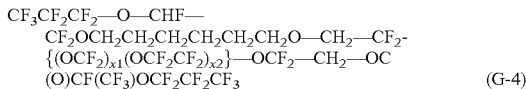
(G-4)

NMR Spectrum of Compound (G-4):
$^1$H-NMR (300.4 MHz, solvent: CDCl$_3$, standard: TMS) δ (ppm): 1.3 (4H), 1.7 (4H), 2.5 (1H), 3.5 (2H), 4.0 (2H), 4.2 (2H), 4.7 (2H), 5.8 (1H).
$^{19}$F-NMR (282.7 MHz, solvent: CDCl$_3$, standard: CFCl$_3$) δ (ppm): −52 to −56 (84F), −79 to −88 (16F), −89 to −91 (40F), −130 (4F), −133 (2F), −146 (1F).
The mean value of x1: the mean value of x2: 10.

Synthetic Example 7-5

A condenser kept at 20° C., a NaF pellet bed and a condenser kept at 0° C. were connected in series to the gas outlet of a 1 L nickel autoclave, with a return line which returns the condensate from the condenser kept at 0° C. to the autoclave.
In the autoclave, 750 g of ClCF$_2$CFClCF$_2$OCF$_2$CF$_2$Cl (hereinafter referred to as CFE-419) was stirred while it was kept at 25° C. After nitrogen gas was blown into the autoclave at 25° C. for 1 hour, 20% fluorine gas was blown in at a flow rate of 2.0 L/hour for 1 hour. While 20% fluorine gas was blown in at the same flow rate, a solution of 6.0 g of compound (G-4) in 54 g of CFE-419 was introduced into the autoclave over 1 hour. The pressure in the autoclave was increased to 0.15 MPa (gauge pressure) while 20% fluorine gas was blown in at the same flow rate. 4 mL of 0.05 g/mL benzene solution in CFE-419 was injected into the autoclave while the inside of the autoclave was heated from 25° C. to 40° C., and then the benzene solution inlet was closed. After 15 minutes of stirring, 4 mL of the benzene solution was injected at a constant temperature of 40° C., and the benzene solution inlet was closed. The same operations were repeated three more times. 0.17 mL of benzene was injected in total. The reaction mixture was stirred for 1 hour while 20% fluorine gas was blown in at the same rate. The inner pressure of the autoclave was returned to atmospheric pressure, and nitrogen gas was blown in for 1 hour. The content of the autoclave was concentrated with an evaporator to obtain 6.1 g of compound (G-5).

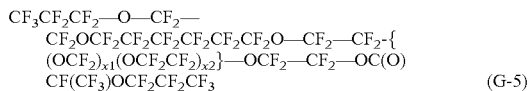
(G-5)

NMR Spectrum of Compound (G-5):
$^{19}$F-NMR (282.7 MHz, solvent: CDCl$_3$, standard: CFCl$_3$) δ (ppm): −52 to −56 (84F), −79 to −88 (20F), −89 to −91 (48F), −121 (4F), −124 (4F), −130 (4F), −133 (1F).
The mean value of x1: 42, the mean value of x2: 10.

Synthetic Example 7-6

Into a PFA round-bottom flask, 6.1 g of compound (G-5) and 10 g of AK-225 were loaded. The mixture was stirred under cooling on an ice bath, and 10 g of methanol was gradually added dropwise from a dropping funnel. The resulting reaction mixture was stirred for 12 hours. The reaction mixture was concentrated with an evaporator to obtain 5.5 g of compound (G-6).

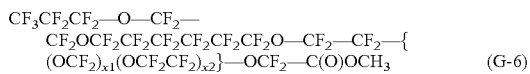
(G-6)

NMR Spectrum of Compound (G-6):
$^1$H-NMR (300.4 MHz, solvent: CDCl$_3$, standard: TMS) δ (ppm): 3.9 (3H).
$^{19}$F-NMR (282.7 MHz, solvent: CDCl$_3$, standard: CFCl$_3$) δ (ppm): −52 to −56 (84F), −79 to −88 (10F), −89 to −91 (48F), −121 (4F), −124 (4F), −130 (2F).
The mean value of x1: 42, and the mean value of x2: 10.

Synthetic Example 7-7

Compound (1-G) was prepared in the same manner as in Synthetic Example 1 except that compound (A-1) was changed to compound (G-6).

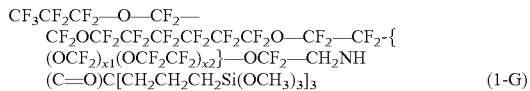
(1-G)

The mean value of x1: 58, and the mean value of x2: 13.

Synthetic Example 8

Compound (1-H) was prepared in the same manner as in Synthetic Example 7 except that HO(C=O)C(CH$_2$CH=CH$_2$)$_3$ was changed to HO(C=O)CH(CH$_2$CH=CH$_2$)$_2$.

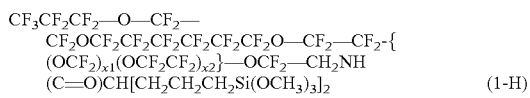
(1-H)

The mean value of x1: 58, and the mean value of x2: 13.

Synthetic Example 9

Compound (1-I) was prepared in the same manner as in Synthetic Example 7 except that compound (G-1) was changed to compound (1-1).

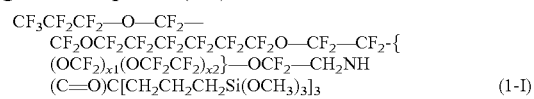
(1-I)

The mean value of x1: 26, and the mean value of x2: 22.

Synthetic Example 10

Compound (1-J) was prepared in the same manner as in Synthetic Example 7 except that $HO(C=O)C(CH_2CH=CH_2)_3$ was changed to $HO(C=O)CH(CH_2CH=CH_2)_2$.

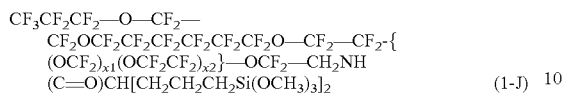
(1-J)

The mean value of x1: 26, and the mean value of x2: 22.

Synthetic Example 11

Compound (2-A) was prepared in accordance with Ex. 11 in WO2017/038830.

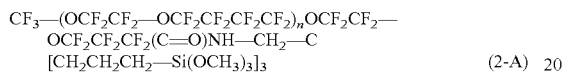
(2-A)

The mean value of n: 13.

Synthetic Example 12

Compound (2-B) was prepared in the same manner as in Synthetic Example 7 except that $H_2NCH_2C(CH_2CH=CH_2)_3$ was changed to $H_2NCH_2CH(CH_2CH=CH_2)_2$.

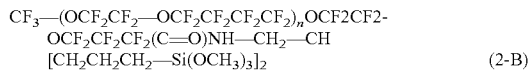
(2-B)

Synthetic Example 13

Compound (2-C) was prepared in the same manner as in Synthetic Example 11 except that $CF_3$—$(OCF_2CF_2$—$OCF_2CF_2CF_2CF_2)_n OCF_2CF_2$—$OCF_2CF_2CF_2(C=O)OCH_3$ (the mean value of n is 13) was changed to compound (G-6).

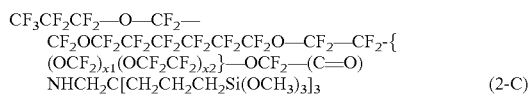
(2-C)

The mean value of x1: 58, and the mean value of x2: 13.

Synthetic Example 14

Compound (2-D) was prepared in the same manner as in Synthetic Example 10 except that $H_2NCH_2C(CH_2CH=CH_2)_3$ was changed to $H_2NCH_2CH(CH_2CH=CH_2)_2$.

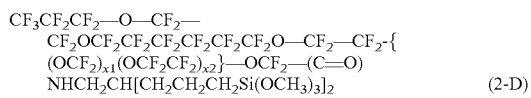
(2-D)

The mean value of x1: 58, and the mean value of x2:13.

Synthetic Example 15

Synthetic Example 15-1

In a 100 mL recovery flask, 50 g of compound (A-1), 50 g of AC3000 and 0.7 g of allylamine were stirred at 40° C. for 6 hours. Then, the crude reaction solution was purified by silica gel chromatography to obtain 33 g (yield: 66%) of compound (K-1) as the desired product.

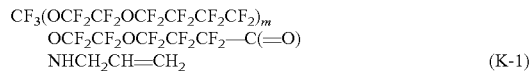
(K-1)

NMR Spectrum of Compound (K-1):
$^1$H-NMR: 6.0 (1H), 5.8 (1H), 5.2 (2H), 4.0 (2H)
$^{19}$F-NMR: −55 (3F), −82 (54F), −87 (52F), −90 (2F), −120 (2F), −123 to −128 (54F)

Synthetic Example 15-2

In a 300 mL three-necked flask equipped with a Dimroth condenser, 33 g of compound (K-1) and 49 g of 1,3-bistrifluoromethylbenzene were stirred in a dry nitrogen atmosphere under cooling on an ice bath. Then, 15 mL of 2.5 M lithium aluminum hydride solution in tetrahydrofuran was gradually added, and the reaction mixture was stirred at room temperature for 30 minutes and then at 100° C. for 5 hours. Then, sodium sulfate decahydrate was added until foaming stopped, and the solid was filtered off through Celite. The filtrate was concentrated to obtain 31 g (yield: 93%) of compound (K-2) as the desired product.

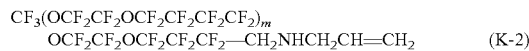
(K-2)

NMR Spectrum of Compound (K-2):
$^1$H-NMR: 5.8 (1H), 5.2 (2H), 3.4 (2H), 3.2 (2H)
$^{19}$F-NMR: −55 (3F), −82 (54F), −87 (52F), −90 (2F), −118 (2F), −123 to −128 (54F)

Synthetic Example 15-3

In a 50 mL three-necked flask equipped with a Dimroth condenser, 10 g of compound (K-2), 7.4 g of triethylamine, 0.3 g of N,N-dimethylaminopyrdine and 10 g of 1,3-bistrifluoromethylbenzene were loaded in a dry nitrogen atmosphere, and 7.4 g of $Cl(C=O)C(CH_2CH=CH_2)_3$ was added at room temperature while the reaction mixture was stirred. After 4 days of stirring at 100° C., the crude reaction solution was purified by silica gel chromatography to obtain 2.6 g (yield: 25%) of compound (K-3) as the desired product.

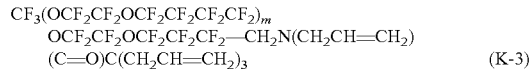
(K-3)

NMR Spectrum of Compound (K-3):
$^1$H-NMR: 5.8 (4H), 5.3 (2H), 5.2 (6H), 4.4 (2H), 4.4 (2H), 4.2 (2H), 1.4 (6H)
$^{19}$F-NMR: −55 (3F), −82 (54F), −87 (52F), −115 (2F), −126 (54F)

Synthetic Example 15-4

Into a 10 mL recovery flask flushed with nitrogen, 0.9 g of compound (K-3), 0.003 g of a xylene solution of platinum/1,3-divinyl-1,1,3,3-tetramethyldisiloxane complex (platinum content: 3 mass %). 0.002 g of aniline and 0.9 g of AC-6000 were loaded, and then 0.11 g of trimethoxysilane was added. The resulting mixture was stirred at 40° C. for 4 hours. Then, the solvent was distilled off to obtain 1.1 g (yield: 98%) of compound (1-K).

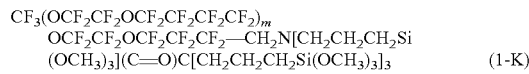
(1-K)

NMR Spectrum of Compound (1-K):
¹H-NMR: 4.2 (2¹4), 3.8 (21H), 3.6 (36H), 1.7 (8H), 1.4 (8H), 0.7 (8H)
¹⁹F-NMR: −55 (3F), −82 (54F), −87 (52F), −115 (2F), −126 (54F)
m was about 13.

Synthetic Example 16

Synthetic Example 16-1

Into a 50 mL three-necked flask, 10 g of compound (K-2), 1.2 g of triethylamine and 10 g of 1,3-bistrifluoromethylbenzene were loaded, and 0.9 g of Cl(C=O)CH(CH₂CH=CH₂)₂ was added with stirring at room temperature. After 1 hours of stirring at room temperature, the crude reaction solution was purified by silica gel chromatography to obtain 2.3 g (yield: 23%) of compound (L-1) as the desired product.

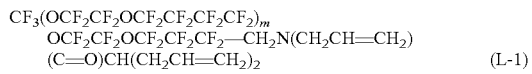

(L-1)

NMR Spectrum of Compound (L-1):
¹H-NMR: 5.8 (3H), 5.2 (2H), 5.0 (4H), 4.2 (6H), 2.8 (1H), 2.3 (4H)
¹⁹F-NMR: −55 (3F), −82 (54F), −87 (52F), −116 (2F), −126 (54F)

Synthetic Example 16-2

Into a 10 mL recovery flask flushed with nitrogen, 1.0 g of compound (L-1), 0.004 g of a xylene solution of platinum/1,3-divinyl-1,1,3,3-tetramethyldisiloxane complex (platinum content: 3 mass %), 0.001 g of aniline and 1.0 g AC-6000 were loaded, and 0.10 g of trimethoxysilane was added. After 4 hours of stirring at 40° C., the solvent was distilled off to obtain 1.1 g (yield: 99%) of compound (1-L).

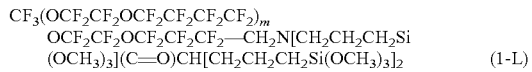

(1-L)

NMR Spectrum of Compound (1-L):
¹H-NMR: 4.2 (2H), 3.6 (27H), 2.8 (1H), 1.8 (4H), 1.4 (6H), 0.7 (6H)
¹⁹F-NMR: −55 (3F), −82 (54F), −87 (52F), −115 (2F), −126 (54F) m was about 13.

Synthetic Example 17

Synthetic Example 17-1

In a 100 mL recovery flask, 50 g of compound (A-1), 50 g of AC-2000 and 1.5 g of H₂NCH₂(C=O)CH(CH₂CH=CH₂)₂ were stirred at 40° C. for 6 hours. Then, the crude reaction solution was purified by silica gel chromatography to obtain 26 g (yield: 52%) of compound (M-1) as the desired product.

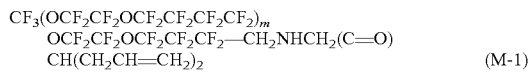

(M-1)

NMR Spectrum of Compound (M-1):
¹H-NMR: 6.4 (1H), 5.6 (2H), 4.9 (4H), 3.2 (2H), 2.0 (4H), 1.6 (1H)
¹⁹F-NMR: −55 (3F), −82 (54F), −87 (52F), −120 (2F), −126 (54F)

Synthetic Example 17-2

In a 300 mL three-necked flask equipped with a Dimroth condenser, 26 g of compound (M-1) and 46 g of 1,3-bistrifluoromethylbenzene were stirred in a dry nitrogen atmosphere on an ice bath. Then, 7 mL of 2.5 M lithium aluminum hydride solution in tetrahydrofuran was gradually added, and the resulting mixture was stirred at room temperature for 30 minutes and then at 100° C. for 5 hours. Then, sodium sulfate decahydrate was added until foaming stopped, and the solid was filtered off though Celite. The filtrate was concentrated to obtain 25 g (yield: 95%) of compound (M-2) as the desired product.

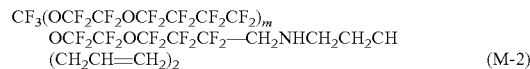

(M-2)

NMR Spectrum of Compound (M-2):
¹H-NMR: 6.0 (2H), 5.3 (4H), 3.5 (2H), 2.9 (2H), 2.3 (4H), 1.8 (1H)
¹⁹F-NMR: −55 (3F), −82 (54F), −87 (52F), −118 (2F), −126 (54F)

Synthetic Example 17-3

In a 50 mL three-necked flask, 10 g of compound (M-2), 1.1 g of triethylamine and 10 g of 1,3-bistrifluoromethylbenzene were loaded in a dry nitrogen atmosphere, and 1.0 g of Cl(C=O)CH(CH₂CH=CH₂)₂ was added with stirring at room temperature. After 24 hours of stirring at room temperature, the crude reaction solution was purified by silica gel chromatography to obtain 2.7 g (yield: 27%) of compound (M-3) as the desired product.

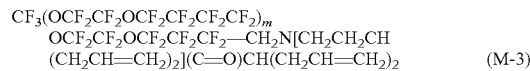

(M-3)

NMR Spectrum of Compound (M-3):
¹H-NMR: 5.8 (4H), 5.0 (8H), 4.3 (2H), 3.5 (2H), 3.0 (1H), 2.5 (2H), 2.3 (2H), 2.2 (2H)
¹⁹F-NMR: −55 (3F), −82 (54F), −87 (52F), −117 (2F), −126 (54F)

Synthetic Example 17-4

In a 10 mL recovery flask flushed with nitrogen, 1.0 g of compound (M-3), 0.004 g of a xylene solution of platinum/1,3-divinyl-1,1,3,3-tetramethyldisiloxane complex (platinum content: 3 mass %), 0.009 g of aniline and 1.0 g Ac-6000 were loaded, and 0.14 g of trimethoxysilane was added. After 4 hours of stirring at 40° C., the solvent was distilled off to obtain 1.1 g (yield: 98%) of compound (1-M).

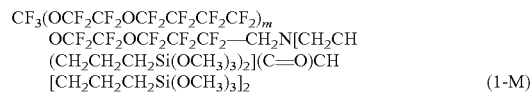

(1-M)

NMR Spectrum of Compound (1-M):
¹H-NMR: 4.5 (2H), 3.8 (36H), 3.0 (1H), 2.0 (3H), 1.7 (8H), 1.5 (8H), 0.7 (8H)
¹⁹F-NMR: −55 (3F), −82 (54F), −87 (52F), −115 (2F), −126 (54F)
m was about 13.

Synthetic Example 18

Synthetic Example 18-1

Into a 50 mL three-necked flask, 10 g of compound (M-2), 1.0 g of triethylamine and 10 g of 1,3-bistrifluoromethylbenzene were loaded in a dry nitrogen atmosphere, and 0.9 g of Cl(C═O)CH$_2$CH$_2$CH═CH$_2$ was added with stirring at room temperature. After 24 hours of stirring at room temperature, the crude reaction solution was purified by silica gel chromatography to obtain 1.3 g (yield: 13%) of compound (N-1) as the desired product.

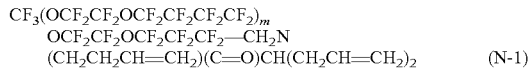

NMR Spectrum of Compound (N-1):
$^1$H-NMR: 5.8 (3H), 5.0 (6H), 4.4 (2H), 3.6 (2H), 2.1 (9H)
$^{19}$F-NMR: −55 (3F), −82 (54F), −87 (52F), −115 (2F), −126 (54F)

Synthetic Example 18-2

Into a 10 mL recovery flask flushed with 10 mL, 0.6 g of compound (N-1), 0.003 g of a xylene solution of platinum/1,3-divinyl-1,1,3,3-tetramethyldisiloxane complex (platinum content: 3 mass %), 0.0006 g of aniline and 0.6 g of AC-6000 were loaded, and 0.07 g of trimethoxysilane was added. After 4 hours of stirring at 40° C., the solvent was distilled off to obtain 0.6 g (yield: 98%) of compound (1-N).

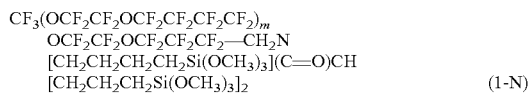

NMR Spectrum of Compound (1-N):
$^1$H-NMR: 4.5 (2H), 3.8 (27H), 2.1 (1H), 1.7 (8H), 1.5 (6H), 0.7 (6H)
$^{19}$F-NMR: −55 (3F), −82 (54F), −87 (52F), −115 (2F), −126 (54F)

[Ex. 1 to 16]

The compound obtained in each Synthetic Example was mixed with Novec-7200 (product name, manufactured by 3M, C$_4$F$_9$OC$_2$H$_5$, b.p. 76° C.) as an organic solvent at a mass ratio of 1/9 (compound/organic solvent) to obtain coating compositions of Ex. 1 to 16.

[Preparation of Test Samples]

The surfaces of substrates were treated with the compound obtained in each Synthetic Example or each coating composition obtained above, by dry coating or wet coating to obtain test samples (articles) comprising substrates (chemically tempered glass) and a surface layer formed on the substrates. The test results are shown in Tables 1 and 2.

(Dry Coating)

For dry coating of substrates, a vacuum deposition apparatus (manufactured by ULVAC Co., VTR-350M). Specifically speaking, 0.5 g of the compound obtained in each Synthetic Example was fed to a molybdenum boat in the vacuum deposition apparatus, and the inside of the vacuum deposition apparatus was evacuated to a level of at most 1×10$^{-3}$ Pa. The boat loaded with the compound was heated at a heating rate of at most 10° C./min, and when the vapor deposition rate measured by a quartz oscillator film thickness meter exceeded 1 nm/sec, the shutter was opened to initiate film deposition on the surface of a substrate. When the film thickness became about 50 nm, the shutter was closed to terminate film deposition on the surface of the substrate. The substrate with the compound deposited thereon was heated at 200° C. for 30 minutes and then washed with AK-225 (product name, manufactured by AGC Inc.) to obtain a test sample (an article) having a surface layer on the surface of the substrate.

(Wet Coating)

A substrate was dipped in each costing composition, allowed to stand for 30 minutes and taken out (dip coating).

The coating was dried at 200° C. for 30 minutes and washed with AK-225 (product name, manufactured by AGC Inc.), to obtain a test sample (an article) having a surface layer on the surface of the substrate.

TABLE 1

| Ex | | 1 | 2 | 3 | 4 | 5 | 6 | 7 | 8 |
|---|---|---|---|---|---|---|---|---|---|
| Fluorinated ether compound | species | 1-A | 1-B | 1-C | 1-D | 1-G | 1-H | 1-I | 1-J |
| Dry coating | Initial contact angle (water) | ○ | ○ | ○ | ○ | ○ | ○ | ○ | ○ |
| | Light resistance | ○ | ○ | ○ | ○ | ○ | ○ | ○ | ○ |
| Wet coating | Initial contact angle (water9 | ○ | ○ | ○ | ○ | ○ | ○ | ○ | ○ |
| | Light resistance | ○ | ○ | ○ | ○ | ○ | ○ | ○ | ○ |

TABLE 2

| Ex. | | 9 | 10 | 11 | 12 | 13 | 14 | 15 | 16 |
|---|---|---|---|---|---|---|---|---|---|
| Fluorinated ether compound | species | 1-K | 1-L | 1-M | 1-N | 2-A | 2-B | 2-C | 2-D |
| Dry coating | Initial contact angle (water) | ○ | ○ | ○ | ○ | ○ | ○ | ○ | ○ |
| | Light resistance | ○ | ○ | ○ | ○ | × | × | × | × |
| Wet coating | Initial contact angle (water9 | ○ | ○ | ○ | ○ | ○ | ○ | ○ | ○ |
| | Light resistance | ○ | ○ | ○ | ○ | × | × | × | × |

Tables 1 and 2 show that when particular fluorinated ether compounds were used, more light-resistant surface layers were formed than when particular fluorinated ether compounds were not used.

This application is a continuation of PCT Application No. PCT/JP2019/046025 filed on Nov. 25, 2019, which is based upon and claims the benefit of priority from Japanese Patent Application No. 2018-222871 filed on Nov. 28, 2018, Japanese Patent Application No. 2018-222872 filed on Nov. 28, 2018 and Japanese Patent Application No. 2019-089666 filed on May 10, 2019. The contents of those applications are incorporated herein by reference in their entireties.

What is claimed is:
1. A fluorinated ether compound, comprising:
a poly(oxyfluoroalkylene) chain;
a reactive silyl group; and
a group (A) represented by —NR—C(O)—,
wherein
R is a hydrogen atom, an alkyl group, or an alkyl group comprising a reactive silyl group,
wherein the carbonyl carbon in the group (A) is bonded to a carbon atom, and
wherein the poly(oxyfluoroalkylene) chain is located at the nitrogen end of the group (A).
2. The compound of claim 1, further comprising:
a group (B) represented by —R$^1$—,
wherein R$^1$ is a C$_{1-10}$ alkylene group having no fluorine atoms, and
wherein the group (B) is bonded to the nitrogen atom in the group (A).
3. The compound of claim 1, which has a formula (1):

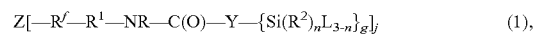

wherein

R$^f$ is a fluoroalkylene group comprising a fluorine atom on the carbon atom bonded to R$^1$, R$^1$ is a C$_{1-10}$ alkylene group having no fluorine atoms, R is a hydrogen atom, an alkyl group, or an alkyl group having a reactive silyl group, Y is a (g+1)-valent organic group having a carbon atom bonded to the carbonyl carbon in the formula (1), R$^2$ is a monovalent hydrocarbon group, L is a hydrolyzable group or a hydroxy group, n is an integer in a range of from 0 to 2, g is an integer of at least 1, j is 1 or 2, and Z is a monovalent group represented by R$^{f1}$—(OX)$_m$—O— with j being 1, or a bivalent group represented by —(OX)$_m$—O— with j being 2, wherein R$^{f1}$ is a perfluoroalkyl group, X is a fluoroalkylene group, and m is an integer of at least 2.

4. The compound of claim 3, wherein the organic group as Y in the formula (1) is a hydrocarbon group which may contain a hetero atom.

5. The compound of claim 3, wherein Y comprises a carbon atom bonded to the silicon atom in {Si(R$^2$)$_n$L$_{3-n}$}$_g$ in the formula (1).

6. The compound of claim 3, having formula (1), wherein Z is a monovalent group represented by R$^{f1}$—(OX)$_m$—O—, wherein X is a C$_{1-6}$ fluoroalkylene group, and (OX)$_m$ comprises at least two different kinds of (OX).

7. The compound of claim 3, wherein Z is a bivalent group represented by —(OX)$_m$—O—, wherein X is a C$_{1-6}$ fluoroalkylene group, and (OX)$_m$ comprises at least two different kinds of (OX).

8. A composition, comprising:

a first fluorinated ether and a second fluorinated ether, wherein the first fluorinated ether is the fluorinated ether compound of claim 1; and the second fluorinated ether is either a fluorinated ether compound of claim 1 that is different from the first fluorinated either or another fluorinated ether compound different from the fluorinated ether compound of claim 1.

9. The composition of claim 8, wherein the first fluorinated ether compound has one group (A) and the second fluorinated ether compound has two groups (A).

10. The composition of claim 9, wherein the first fluorinated ether compound has formula (1a),

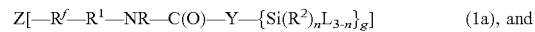  (1a), and wherein the second fluorinated ether compound has formula (1b) with j being 2:

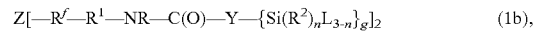  (1b), wherein, in the formula (1a) and (1b), independently,

R$^f$ is a fluoroalkylene group comprising a fluorine atom on the carbon atom bonded to R$^1$, R$^1$ is a C$_{1-10}$ alkylene group having no fluorine atoms, R is a hydrogen atom, an alkyl group, or an alkyl group comprising a reactive silyl group, Y is a (g+1)-valent organic group comprising a carbon atom bonded to the carbonyl carbon in the formula (1a) or (1b), R$^2$ is a monovalent hydrocarbon group, L is a hydrolyzable group or a hydroxy group, n is an integer in a range of from 0 to 2, g is an integer of at least 1, and Z is a monovalent group represented by R$^{f1}$—(OX)$_m$O— in the formula (1a), Z is bivalent group represented by —(OX)$_m$—O— in the formula (1b), wherein R$^{f1}$ is a perfluoroalkyl group, X is a fluoroalkylene group, and m is an integer of at least 2.

11. A coating composition, comprising:

one or more of the fluorinated ether compounds of claim 1, optionally another fluorinated ether compound different from the fluorinated ether compound of claim 1; and a liquid medium.

12. An article, comprising:

a substrate; and a surface layer, formed from one or more of the fluorinated ether compounds of claim 1, and optionally another fluorinated ether compound different from the fluorinated ether compound of claim 1, on the substrate.

13. The compound of claim 3, wherein R$^f$ is a fluoroalkylene group comprising more than one fluorine atom on the carbon atom bonded to R$^1$.

14. The composition of claim 10, wherein, in the formula (1a) and/or (1b), R$^f$ is a fluoroalkylene group comprising more than one fluorine atom on the carbon atom bonded to R$^1$.

* * * * *